United States Patent
Tao et al.

(10) Patent No.: US 8,133,154 B2
(45) Date of Patent: Mar. 13, 2012

(54) CONTROL SYSTEM AND METHOD FOR ACCELERATOR PEDAL BASED SHIFT POINT STABILIZATION FOR AN AUTOMATIC TRANSMISSION

(75) Inventors: Xuefeng Tim Tao, Northville, MI (US); David Chris Webert, Livonia, MI (US); John E. Marano, Milford, MI (US); Scott R. Verna, Dexter, MI (US)

(73) Assignee: GM Global Technology Operations LLC

( * ) Notice: Subject to any disclaimer, the term of this patent is extended or adjusted under 35 U.S.C. 154(b) by 472 days.

(21) Appl. No.: 12/359,616

(22) Filed: Jan. 26, 2009

(65) Prior Publication Data

US 2009/0233765 A1 Sep. 17, 2009

Related U.S. Application Data

(60) Provisional application No. 61/037,079, filed on Mar. 17, 2008.

(51) Int. Cl.
 *F16H 59/48* (2006.01)
(52) U.S. Cl. ........................................ 477/120
(58) Field of Classification Search ............... None
 See application file for complete search history.

(56) References Cited

U.S. PATENT DOCUMENTS

| | | | | |
|---|---|---|---|---|
| 4,976,170 A | * | 12/1990 | Hayashi et al. | 477/43 |
| 4,996,893 A | * | 3/1991 | Nakamura et al. | 477/120 |
| 5,233,523 A | * | 8/1993 | Follmer | 701/51 |
| 5,319,998 A | * | 6/1994 | Iwatsuki et al. | 477/149 |
| 5,411,449 A | * | 5/1995 | Takahashi et al. | 477/120 |
| 5,499,953 A | * | 3/1996 | Hayasaki | 477/120 |
| 5,624,351 A | * | 4/1997 | Fujita et al. | 477/148 |
| 5,662,548 A | * | 9/1997 | Mori | 477/114 |
| 5,769,754 A | * | 6/1998 | Kil | 477/133 |
| 5,795,266 A | * | 8/1998 | Hasegawa et al. | 477/169 |
| 6,368,249 B1 | * | 4/2002 | Hubbard | 477/121 |
| 6,442,467 B1 | * | 8/2002 | Schuler et al. | 701/51 |
| 6,623,403 B2 | * | 9/2003 | Ishiguro et al. | 477/120 |
| 6,830,532 B1 | * | 12/2004 | Gebby et al. | 477/3 |
| 6,855,092 B2 | * | 2/2005 | Duty et al. | 477/121 |
| 2007/0129213 A1 | | 6/2007 | Pfisterer et al. | |

FOREIGN PATENT DOCUMENTS

| | | |
|---|---|---|
| DE | 19849059 A1 | 4/2000 |
| DE | 10055957 A1 | 5/2002 |
| DE | 10360073 A1 | 7/2004 |
| DE | 102005057805 | 6/2007 |

OTHER PUBLICATIONS

German Office Action for 102009012727.5-14 dated Aug. 3, 2009; 3 pages.

* cited by examiner

*Primary Examiner* — Dirk Wright

(57) ABSTRACT

A control system for determining a desired gear ratio of an automatic transmission includes a pedal rate module that determines a pedal rate of an accelerator pedal, and a shift module that determines the desired gear ratio of the transmission based on a position of the accelerator pedal and the pedal rate. The shift module determines the desired gear ratio based on a comparison of the pedal rate and a predetermined rate. The predetermined rate is based on a first period since the transmission shifted into a current gear. The shift module also determines the desired gear ratio based on one of a second period the pedal rate remains less than a positive rate and a third period the pedal rate remains greater than a negative rate. A related control method is also provided.

20 Claims, 13 Drawing Sheets

CONTROL SYSTEM AND METHOD FOR ACCELERATOR PEDAL BASED SHIFT POINT STABILIZATION FOR AN AUTOMATIC TRANSMISSION

CROSS-REFERENCE TO RELATED APPLICATIONS

This application claims the benefit of U.S. Provisional Application No. 61/037,079, filed on Mar. 17, 2008. The disclosure of the above application is incorporated herein by reference.

FIELD

The present disclosure relates to automatic transmissions, and more particularly, to control systems and methods for automatic transmissions.

BACKGROUND

The statements in this section merely provide background information related to the present disclosure and may not constitute prior art.

Motorized vehicles may include a powerplant (e.g., an engine, an electric motor and/or a combination thereof) that produces drive torque that is transmitted through a transmission, such as an automatic transmission, to wheels of the vehicle. The drive torque is transmitted through one of various gear ratios of the transmission to achieve a desired axle torque.

Operation of the powerplant and transmission are commonly regulated by one or more control modules to achieve the desired axle torque. For example, an engine control module may be used to regulate a throttle that controls the air entering the engine. Additionally, a transmission control module may be used to select the gear ratio. Automatic transmissions may shift automatically based on various vehicle operating conditions, such as vehicle speed, drive torque, and throttle position.

Typically, a desired transmission operating range may be selected by the vehicle operator using a driver interface device, such as a gear selector mechanism. The ranges provided by most automatic transmissions may generally include PARK, REVERSE, NEUTRAL, and DRIVE. In DRIVE, the automatic transmission may be regulated to shift between different forward gear ratios based on the vehicle speed drive torque, and throttle position.

Additionally, the desired axle torque may be selected by the vehicle operator using another driver interface device, such as an accelerator pedal. Based on the desired transmission operating range and desired axle torque selected by the vehicle operator, a desired gear ratio may be determined. The desired gear ratio may be determined via table lookup of throttle position versus vehicle speed in a base shift pattern calibration table for the current gear ratio. The base shift pattern calibration tables for each of the forward gear ratios may be calibrated to achieve overall vehicle performance, fuel economy, and driveability objectives.

SUMMARY

The present disclosure provides a control system for determining a desired gear ratio of an automatic transmission. In one form, the control system may include a pedal rate module that determines a pedal rate of an accelerator pedal, and a shift module that determines a desired gear ratio of the transmission based on a position of the accelerator pedal and the pedal rate.

In another form, the control system may include a pedal rate module that determines a pedal rate based on a first pedal position of an accelerator pedal; a position module that determines an adjusted pedal position based on a comparison of the first pedal position and a predetermined shift point and a comparison of the pedal rate and a predetermined rate; and a shift module that determines the desired gear of the transmission based on the adjusted pedal position.

The present disclosure also provides a control method for determining a desired gear ratio of an automatic transmission. In one form, the control method includes determining a pedal rate based on a first pedal position of an accelerator pedal, and determining the desired gear ratio of the transmission based on the first pedal position and the pedal rate.

In another form, the control method includes determining a pedal rate based on a first pedal position of an accelerator pedal; determining an adjusted pedal position based on a comparison of the first pedal position and a predetermined shift point and a comparison of the pedal rate and a threshold rate; and determining the desired gear of the transmission based on the adjusted pedal position.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The present disclosure will become more fully understood from the detailed description and the accompanying drawings, wherein.

Figure 4:
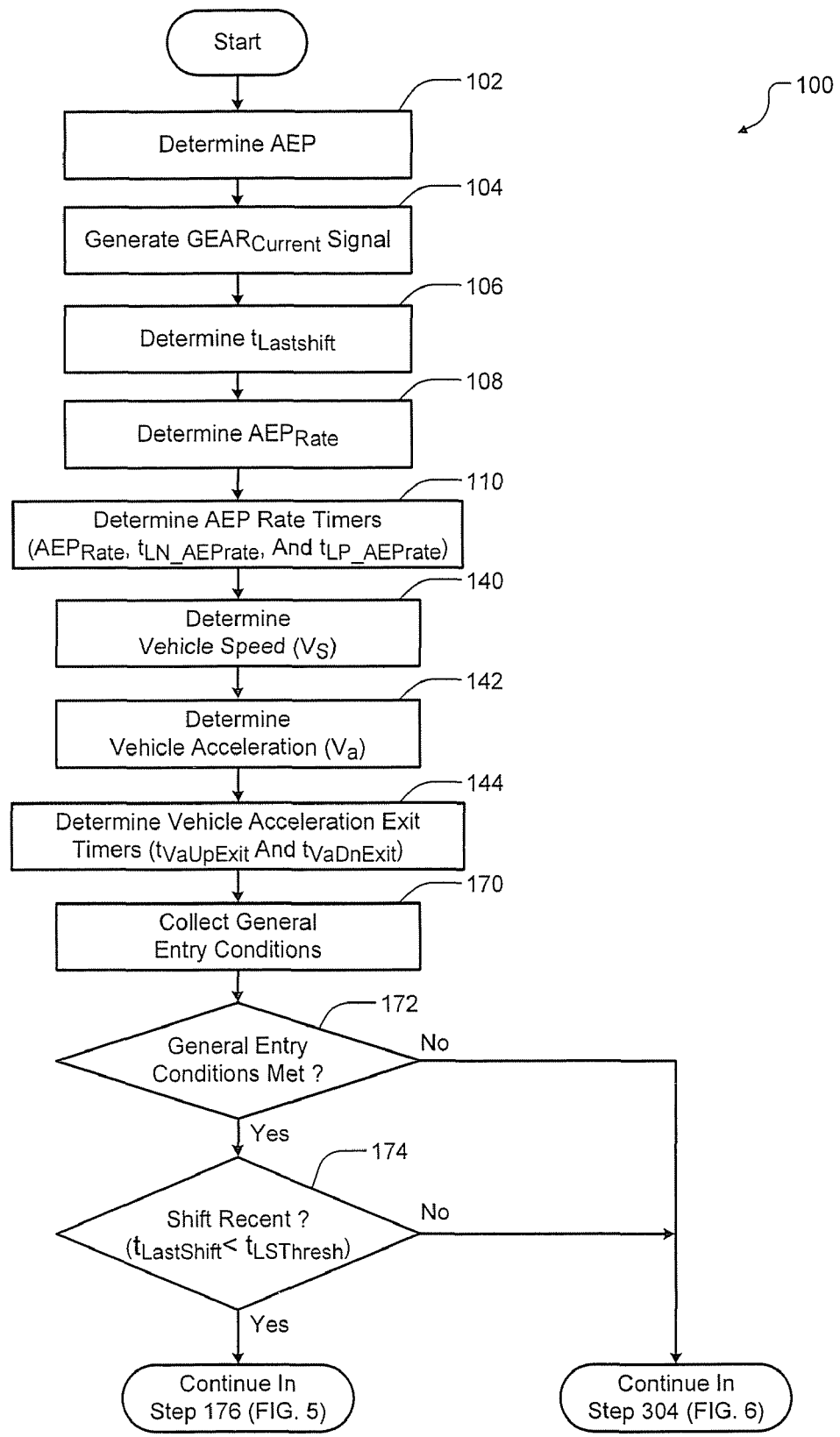
FIG. 4 is a partial flow diagram illustrating exemplary steps for an accelerator pedal based shift point stabilization method according to the principles of the present disclosure.
Figure 5:
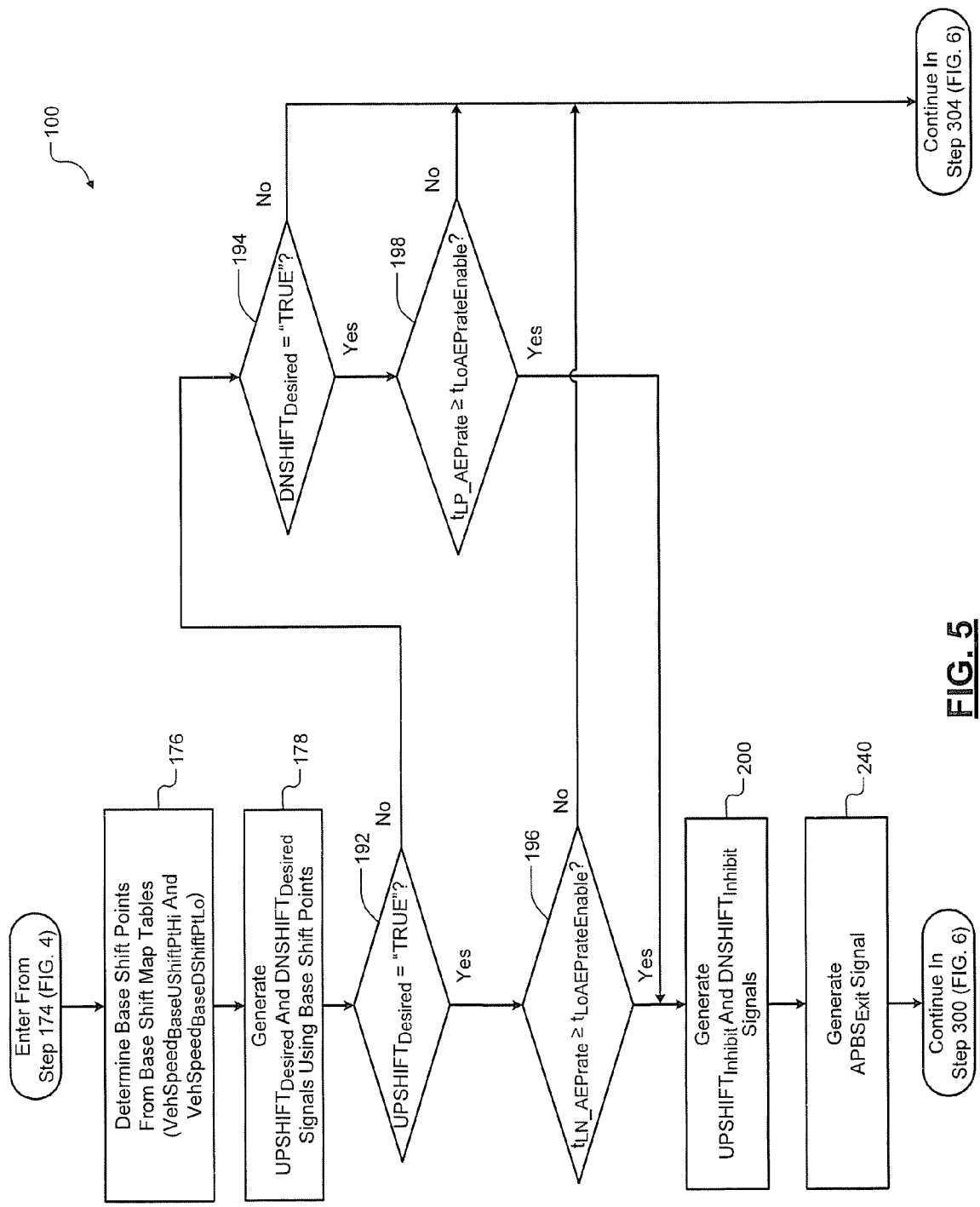
FIG. 5 is a partial flow diagram illustrating exemplary steps for an accelerator pedal based shift point stabilization method according to the principles of the present disclosure.
Figure 6:
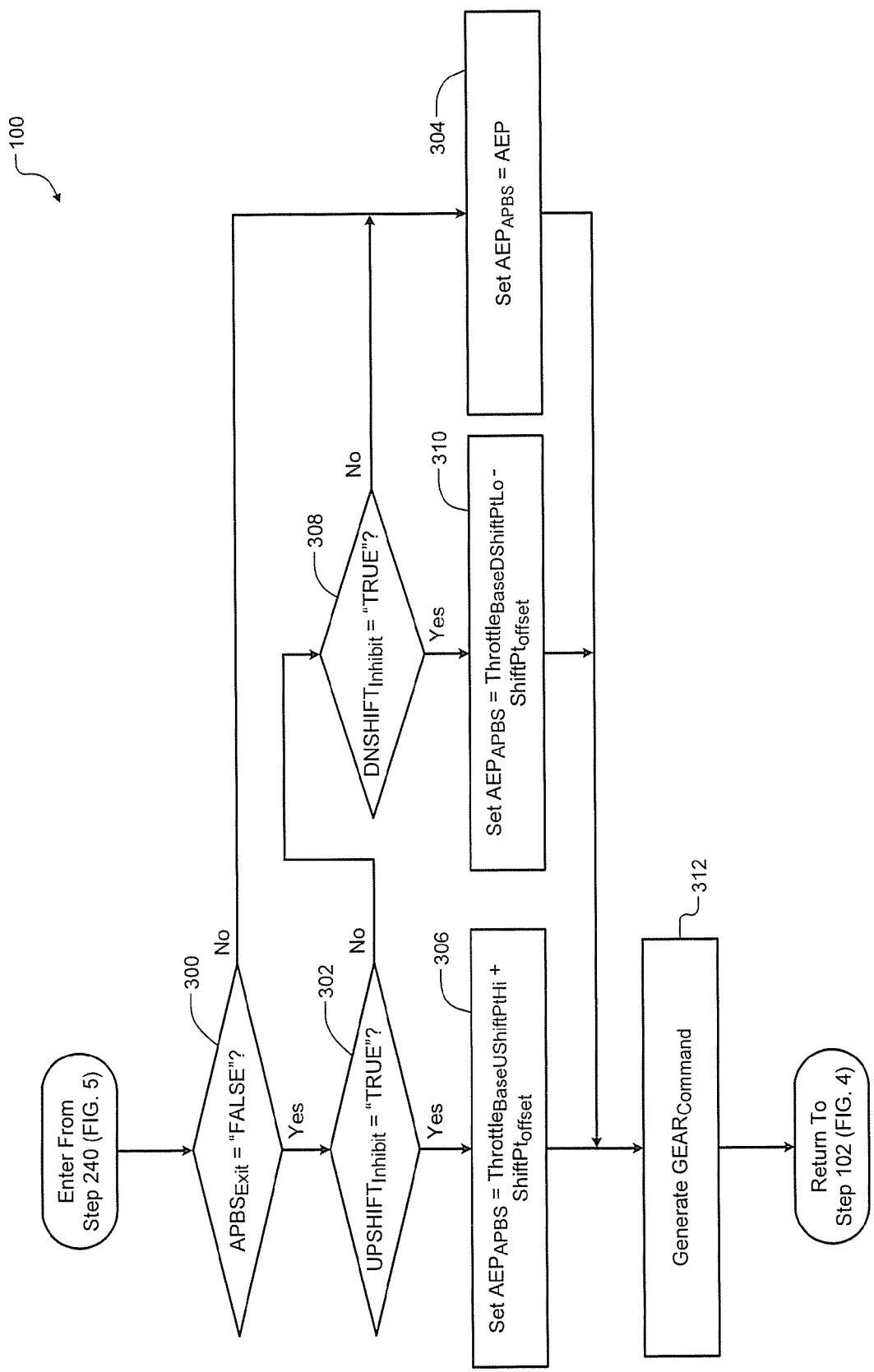
Figure 8:
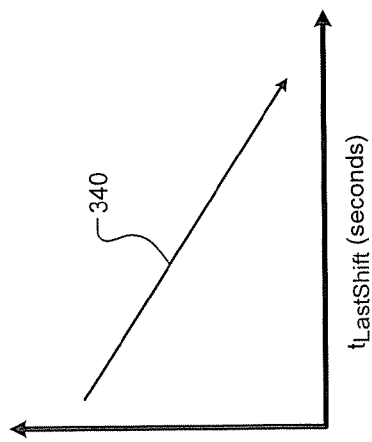
Figure 7:
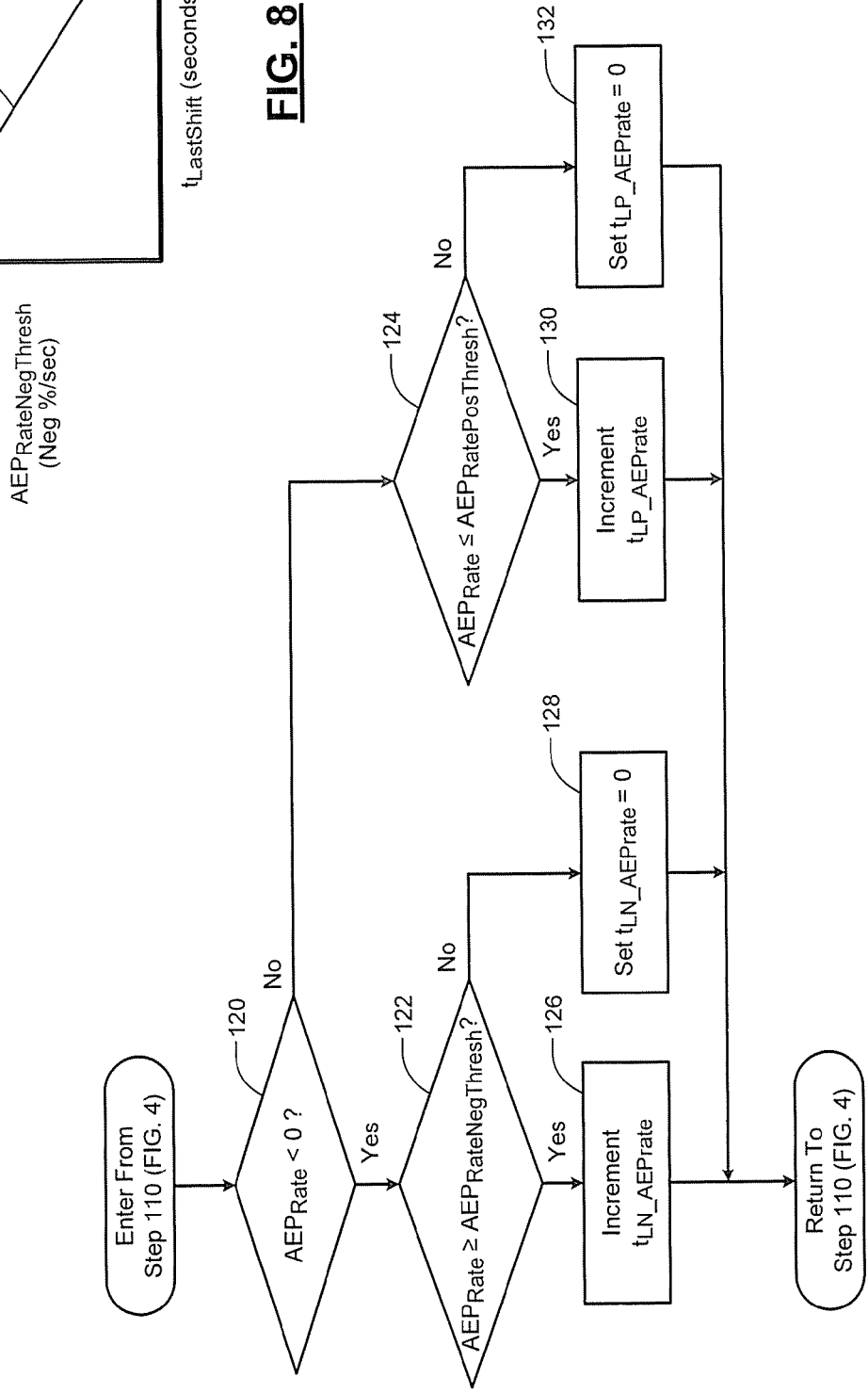
Figure 10:
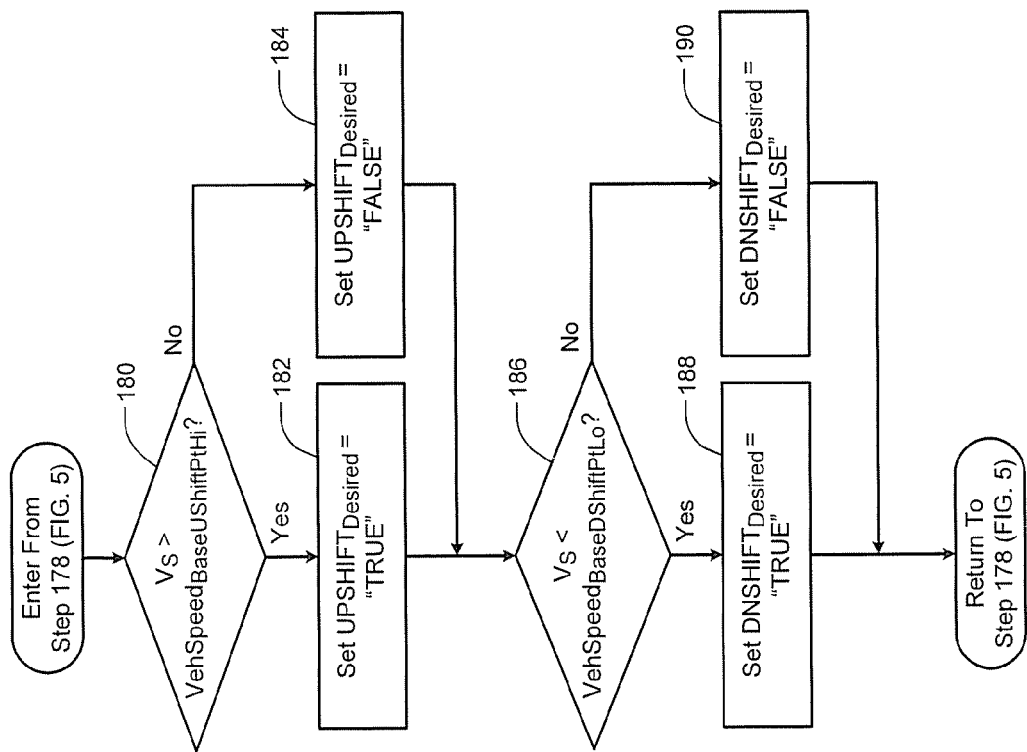
Figure 9:
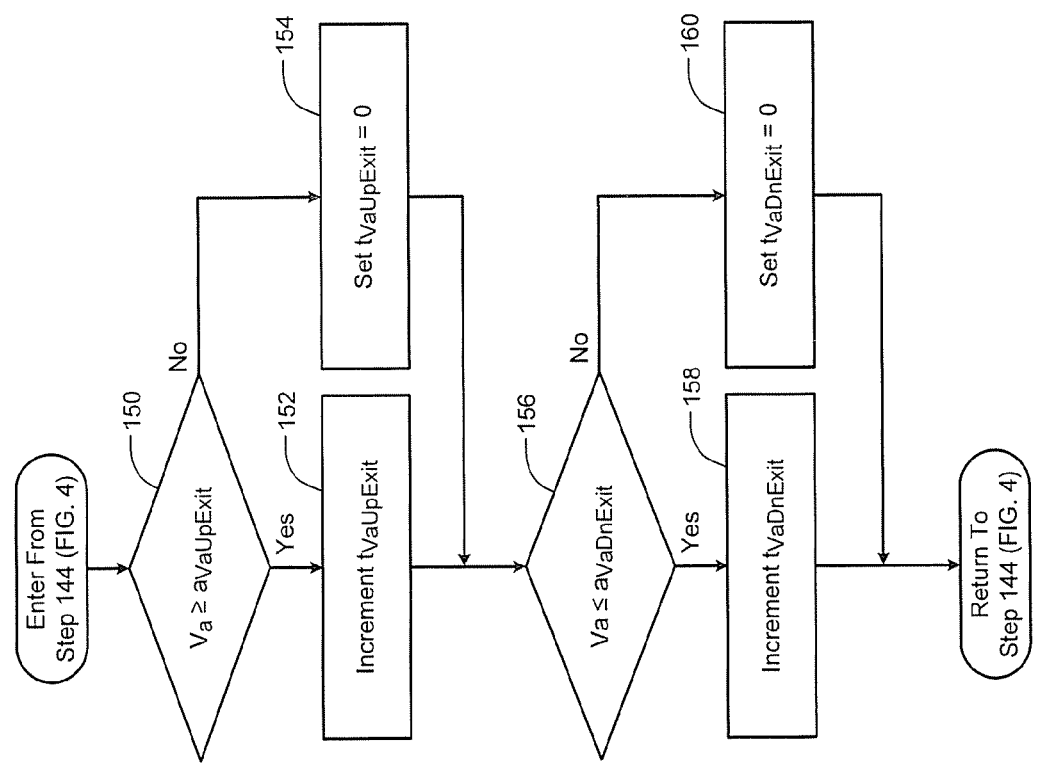
Figure 11:
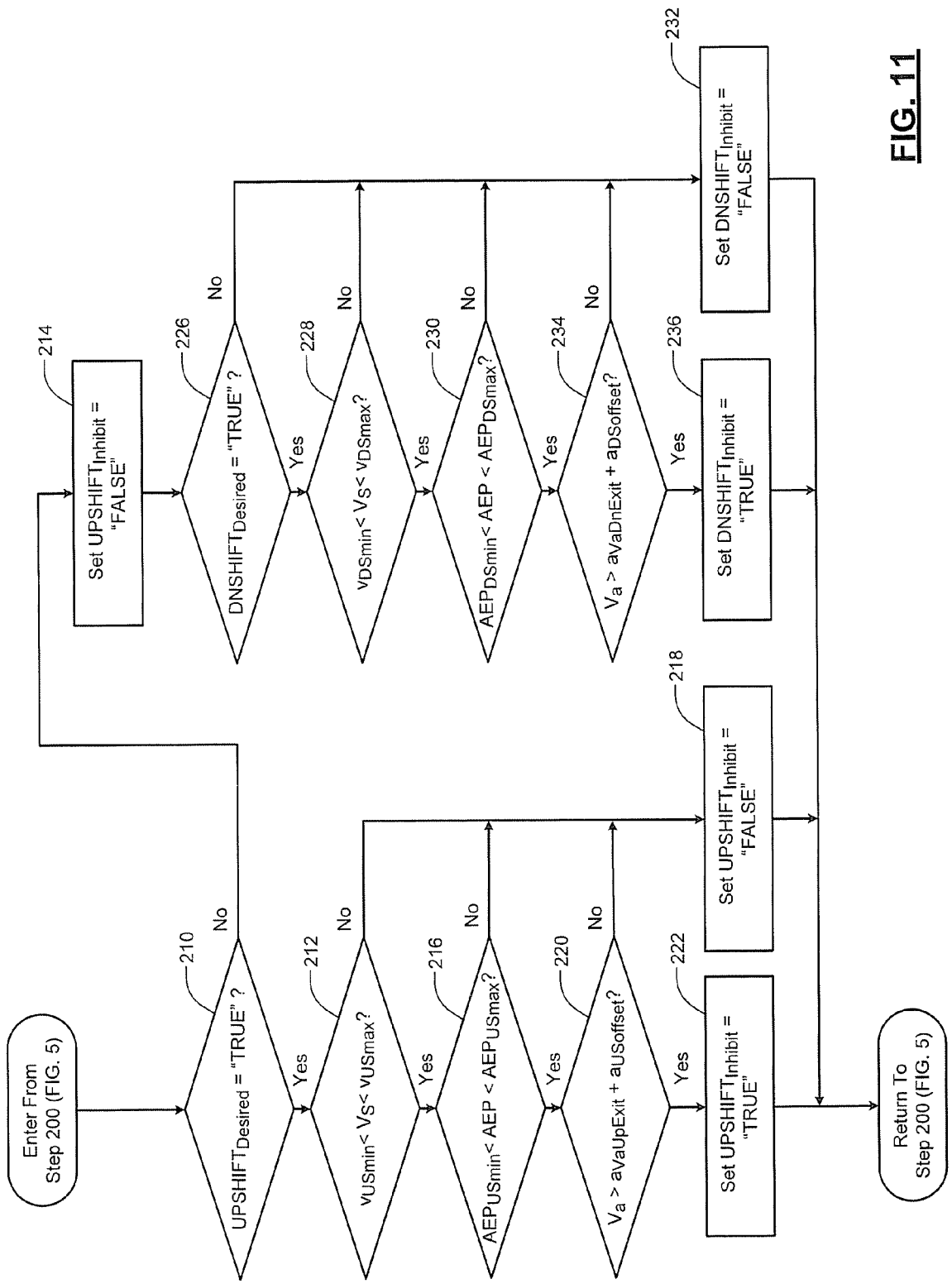
Figure 12:
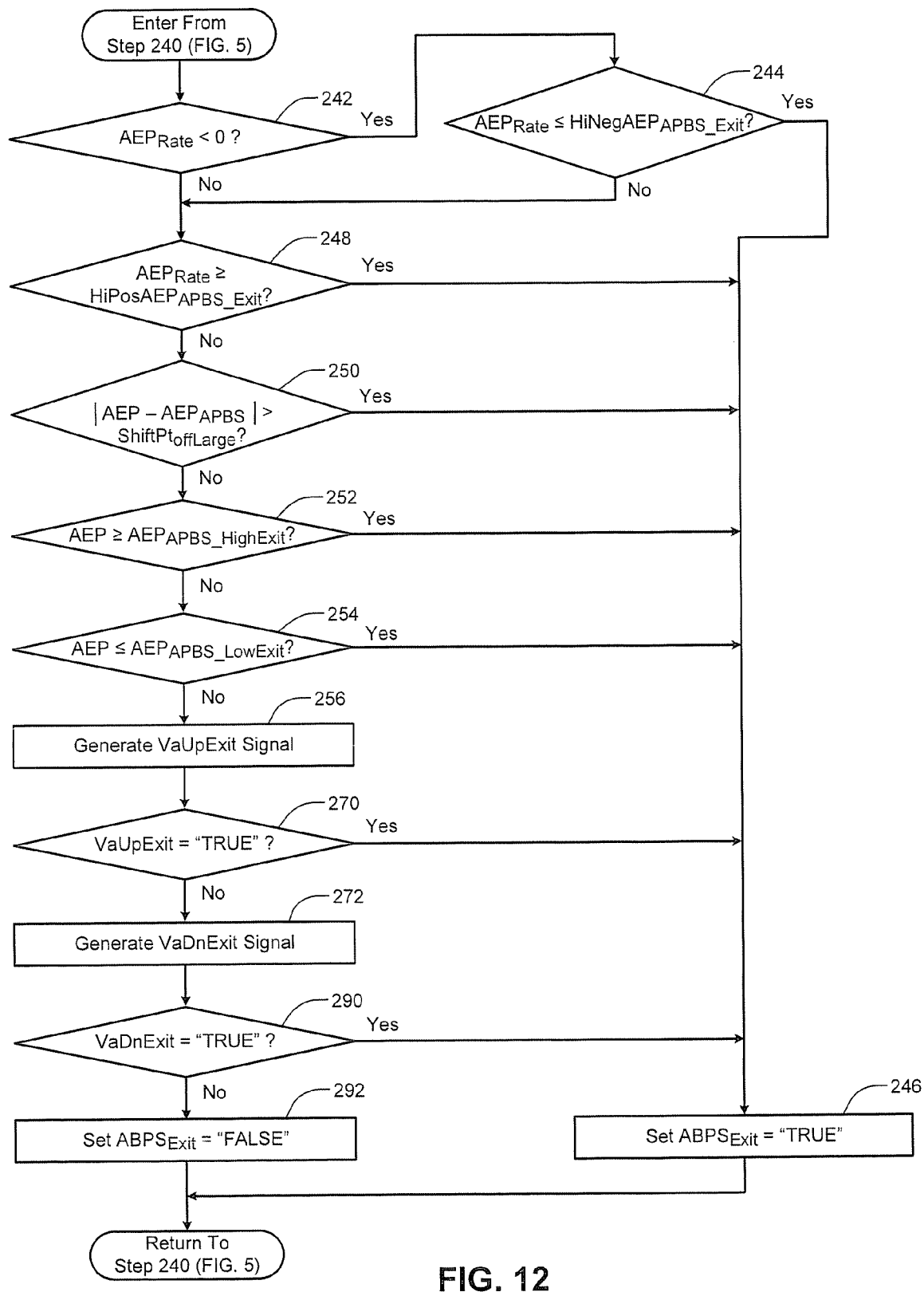
Figures 13, 14:
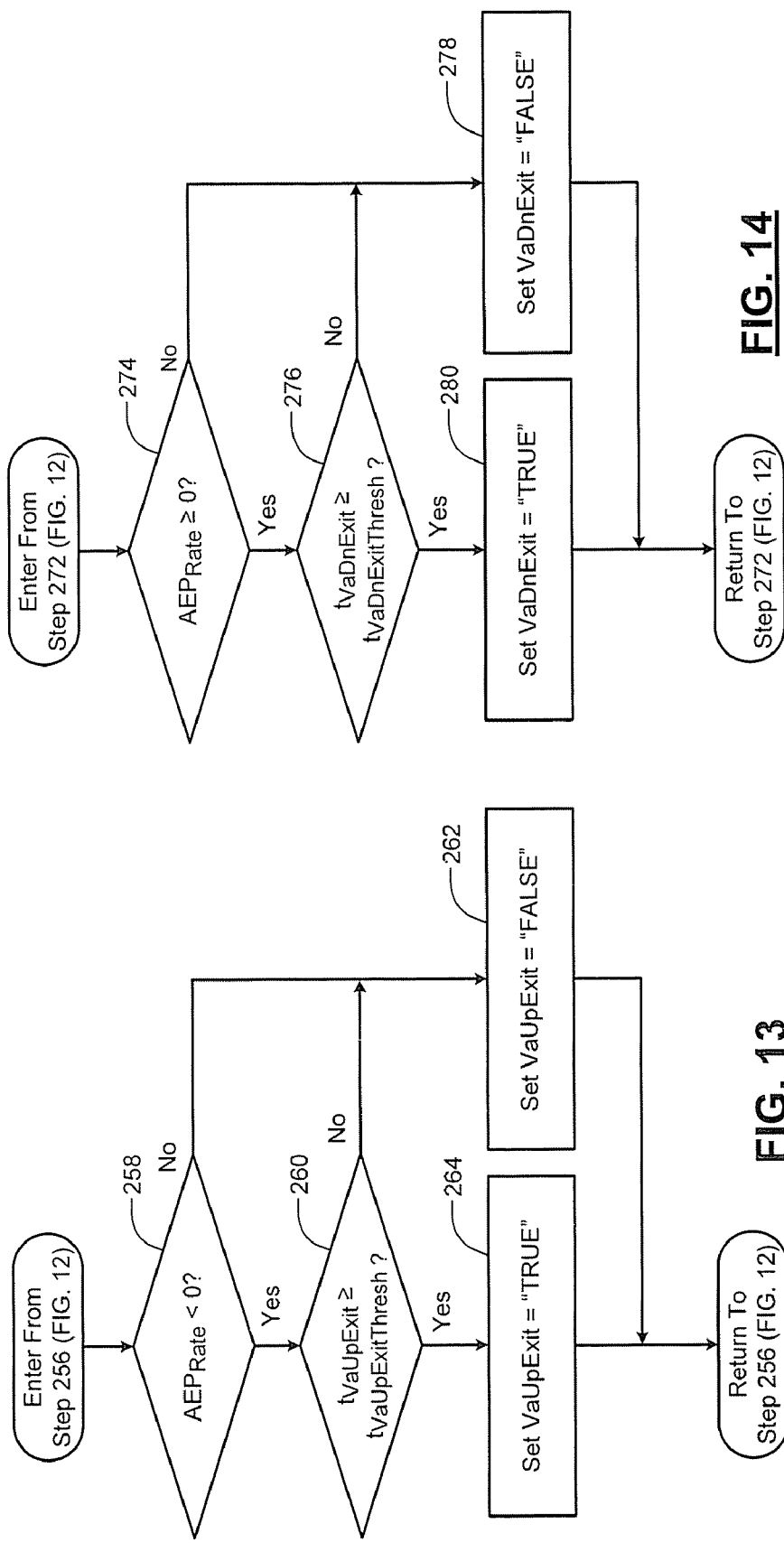
Figure 15:
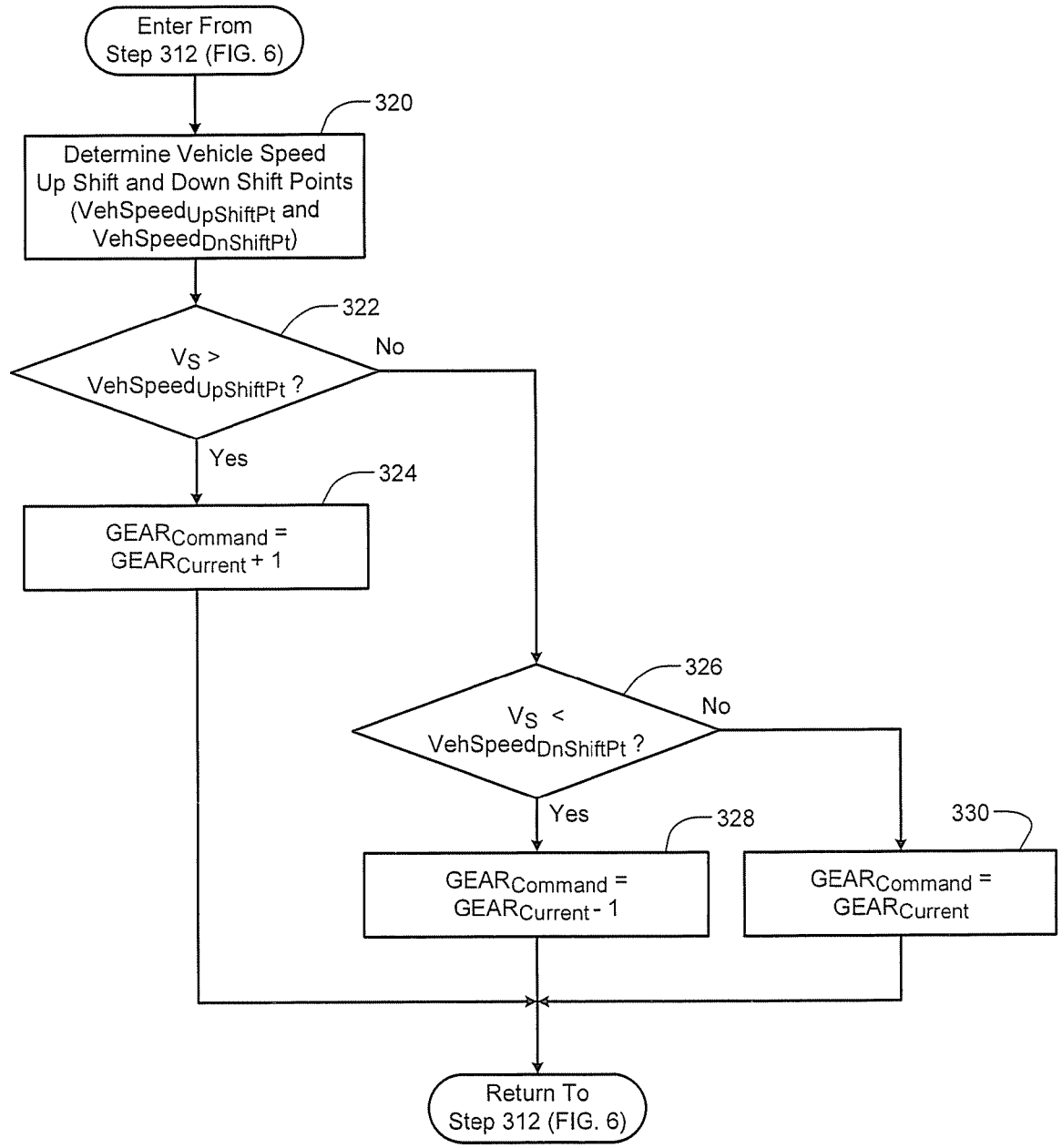
Figure 16:
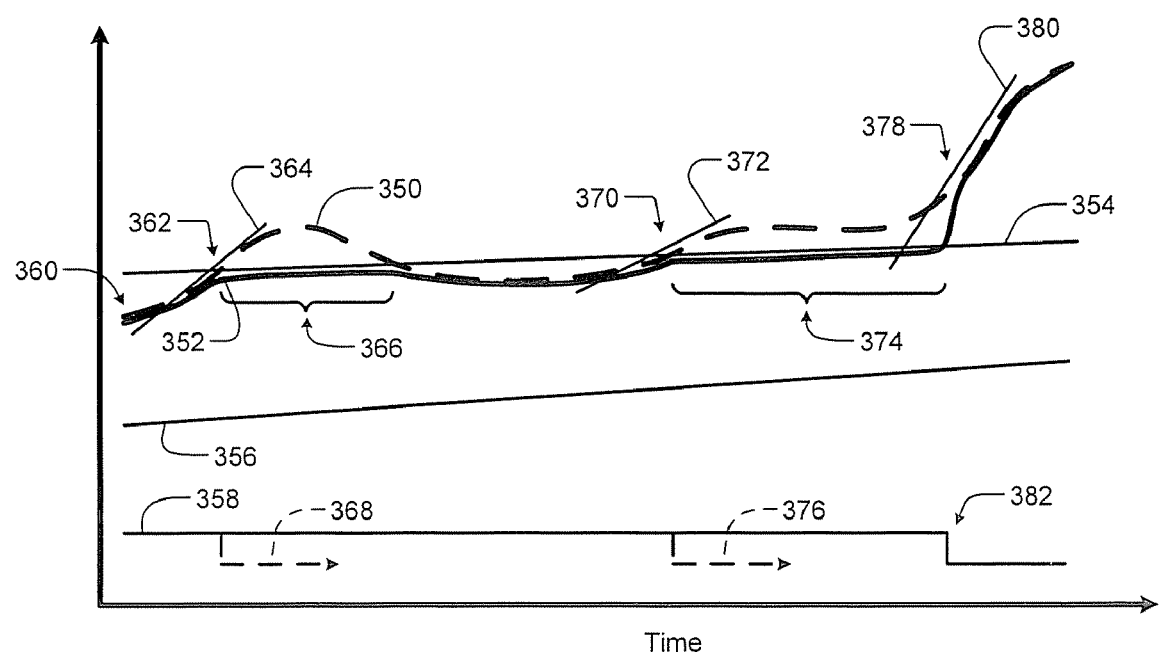

FIG. 6. is a partial flow diagram illustrating exemplary steps for an accelerator pedal based shift point stabilization method according to the principles of the present disclosure;

FIG. 7 is a flow diagram illustrating additional exemplary steps of the control method illustrated in FIGS. 4-6;

FIG. 8 is a graph illustrating the relationship between two control parameters of the control method illustrated in FIGS. 4-6;

FIG. 9 is a flow diagram illustrating additional exemplary steps of the control method illustrated in FIGS. 4-6;

FIG. 10 is a flow diagram illustrating additional exemplary steps of the control method illustrated in FIGS. 4-6;

FIG. 11 is a flow diagram illustrating additional exemplary steps of the control method illustrated in FIGS. 4-6;

FIG. 12 is a partial flow diagram illustrating additional exemplary steps of the control method illustrated in FIGS. 4-6;

FIG. 13 is a partial flow diagram illustrating additional exemplary steps of the control method illustrated in FIG. 12;

FIG. 14 is a partial flow diagram illustrating additional exemplary steps of the control method illustrated in FIG. 12;

FIG. 15 is a flow diagram illustrating additional exemplary steps of the control method illustrated in FIGS. 4-6; and FIG. 16 is a graph illustrating the general operation of the control method illustrated in FIGS. 4-15.

DETAILED DESCRIPTION

The following description is merely exemplary in nature and is not intended to limit the present disclosure, application, or uses. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 1:
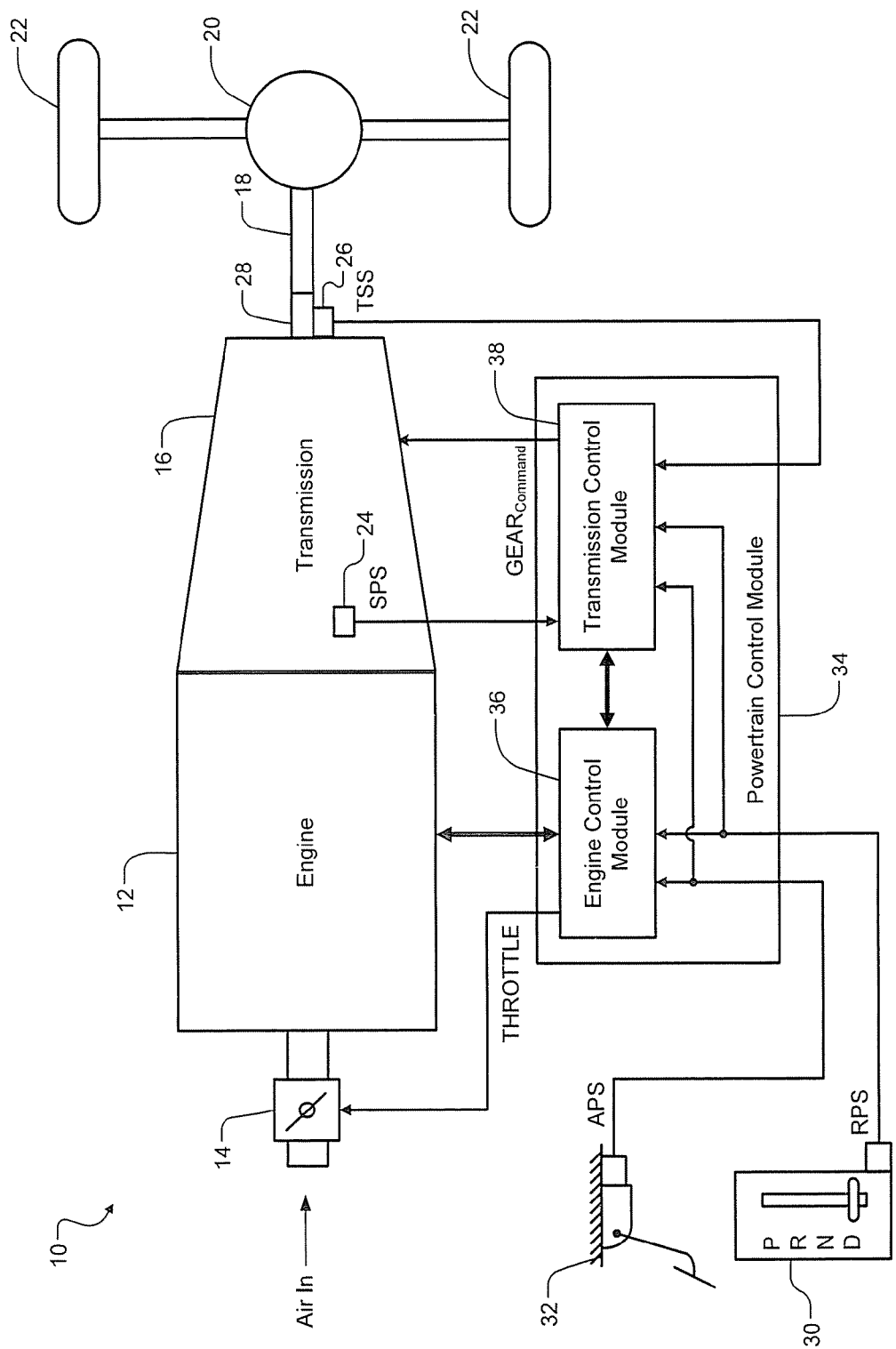
FIG. 1 is a functional block diagram of an exemplary vehicle system according to the principles of the present disclosure.

Referring to FIG. 1, a functional block diagram of an exemplary vehicle system 10 is shown. The vehicle system 10 may include an engine 12 that combusts an air and fuel mixture to produce drive torque. Air may be drawn into the engine through a throttle 14 that regulates the amount of airflow into the engine 12. Drive torque produced by the engine may be transferred through a transmission 16, a driveshaft 18, and a differential 20 to drive a pair of wheels 22.

The transmission 16 is preferably an automatic transmission. The transmission 16 may transfer the drive torque to the differential 20 via the driveshaft 18 through one of a plurality of ranges or gear ratios of the transmission 16. The transmission 16 may include a plurality of hydraulic shift valves (not shown) for shifting the transmission 16 between the various gear ratios. Depending on transmission hardware design, a combination of discrete solenoids may be provided to shuttle the hydraulic shift valves and thereby achieve a fixed gear state corresponding to each of the gear ratios.

The transmission 16 may further include one or more solenoid position sensing devices 24 and a transmission speed sensor 26. The solenoid position sensing devices 24 may be located in the transmission 16 to sense the position of the solenoid actuated hydraulic shift valves used to shift the transmission 16. Alternatively, the solenoid position sensing devices 24 may be pressure sensing devices that sense fluid pressure downstream of the hydraulic shift valves.

The solenoid position sensing devices 24 may generate signals corresponding to a position of each of the hydraulic shift valves that may be used to determine the gear state (i.e., gear ratio). For simplicity, a single solenoid position sensing device 24 is shown. The solenoid position sensing device 24 generates a solenoid position signal (SPS) that indicates the current gear state. The SPS signal may be used to determine the current gear ratio in which the transmission 16 is operating and whether the transmission 16 is shifting between two gear ratios of the transmission 16 (i.e., up shifting or down shifting).

The transmission speed sensor 26 may be located in the transmission 16 to sense the rotational speed of an output shaft 28 of the transmission 16. The transmission speed sensor 26 may generate a transmission speed signal (TSS) that may be used to determine a rotational speed of the transmission 16. While a single transmission speed sensor 26 is shown, additional transmission speed sensors may be provided. For example only, an additional transmission speed sensor may be located in the transmission 16 to sense the rotational speed of an input shaft (not shown) of the transmission 16. Together, the signals generated by the transmission speed sensors may be used to determine the current gear ratio in which the transmission 16 is operating and to help control shifts between gear ratios of the transmission 16.

A driver of the vehicle system 10 may select a desired operating range of the transmission 16 using a range selector device 30. The range selector device 30 may generate a range position signal (RPS) that may be used to determine a desired gear ratio of the transmission 16. The driver of the vehicle system 10 may also indicate a desired axle torque using an accelerator pedal 32. The accelerator pedal 32 generates an accelerator pedal signal (APS) that may be used to determine a position of the accelerator pedal 32.

Operation of the engine 12 and transmission 16 may be controlled by a powertrain control module 34. The powertrain control module 34 may generate timed engine and transmission control signals based on various signals generated by the vehicle system 10. For example, the powertrain control module 34 may include an engine control module 36 and a transmission control module 38. The engine control module 36 and transmission control module 38 may communicate and thereby work together to control the operation of the engine 12 and transmission 16.

The engine control module 36 may receive the RPS signal generated by the range selector device 30 and the APS signal generated by the accelerator pedal 32. Based on signals that include, but not limited to, the RPS and APS signals, the engine control module 36 may generate timed engine control signals that include a throttle control signal (THROTTLE). The engine control module 36 may output the THROTTLE signal to the throttle 14 for regulating the flow of air into the engine 12. The engine control module 36 may also output various other timed engine control signals to the engine 12 to regulate combustion in the engine.

The engine control module 36 may further generate a cruise control signal (CRUISE) indicating whether the engine control module 36 is operating in a cruise control mode. The cruise control mode may be selected by the operator of the vehicle system 10 using a cruise control switch (not shown). The engine control module 36 may output the CRUISE signal along with other timed engine control signals as may be desired, to the transmission control module 38.

The transmission control module 38 may receive the RPS and APS signals generated by the range selector device 30 and the accelerator pedal 32, respectively, along with the SPS and TSS signals generated by the transmission 16. Based on signals that include, but not limited to, the RPS, APS, SPS, and TSS signals, the transmission control module 38 may determine a new desired gear ratio.

The transmission control module 38 also may generate timed transmission control signals that include a commanded gear signal ($GEAR_{Command}$) based on the new desired gear ratio. The $GEAR_{Command}$ signal is used to assign a gear state corresponding to the new desired gear ratio. The transmission control module 38 may output the $GEAR_{Command}$ signal to the transmission 16 for shifting the transmission 16 into the new desired gear ratio. More specifically, the transmission control module 38 may output the $GEAR_{Command}$ signal to schedule up shifts and down shifts between the current gear ratio and the new desired gear ratio.

The control system and method of the present disclosure are directed to improving the determination of the new desired gear ratio. More specifically, the control system and method of the present disclosure improve the scheduling of shifts between the various gear ratios of the transmission 16 to minimize what is commonly referred to as "shift busyness." Shift busyness is generally used to refer to unnecessary up shifts or down shifts that may be scheduled during low to moderate driving maneuvers by the driver of the vehicle system 10.

In one approach used by the prior art, the new desired gear ratio is determined via table lookup of the throttle position versus vehicle speed for the current gear ratio in a "base" shift pattern calibration table. The base shift pattern calibration table contains base up shift points for a given gear ratio and accelerator pedal position that correspond to the vehicle speed above which an up shift is desired. The base shift pattern calibration table also contains base down shift points for a given gear ratio and accelerator pedal position that correspond to the vehicle speed below which a down shift is desired.

As the number of fixed ratios of the transmission are increased, the corresponding up shift and down shift points for each gear ratio may become more crowded (i.e., closer in value to one another) over a given vehicle speed range. One or more successive up shifts or down shifts may be scheduled during moderate accelerator pedal maneuvers and produce excess vehicle performance. The combination of successive up shifts and down shifts may produce undesirable shift busyness.

To avoid undesirable shift busyness, an accelerator pedal based shift stabilization (APBS) control system and method are provided herein. The APBS control system and method of the present disclosure avoids shift busyness by providing a modified accelerator effective position of the accelerator pedal 32 that may be used to look up the corresponding up shift and down shift points. The APBS control system and method determines the modified accelerator effective position based on an accelerator effective position (AEP) rate, time since last shift complete, vehicle acceleration, and current gear ratio.

The APBS control system and method includes control parameters that are used to determine the modified accelerator effective position. The APBS control system and method may be used to stabilize shift scheduling by preventing unnecessary down shifts during moderate accelerator pedal step-in (i.e., depress) maneuvers. The APBS control system and method also may be used to stabilize shift scheduling by preventing unnecessary up shifts during moderately decreasing pedal lift (i.e., release) maneuvers.

Figure 2:
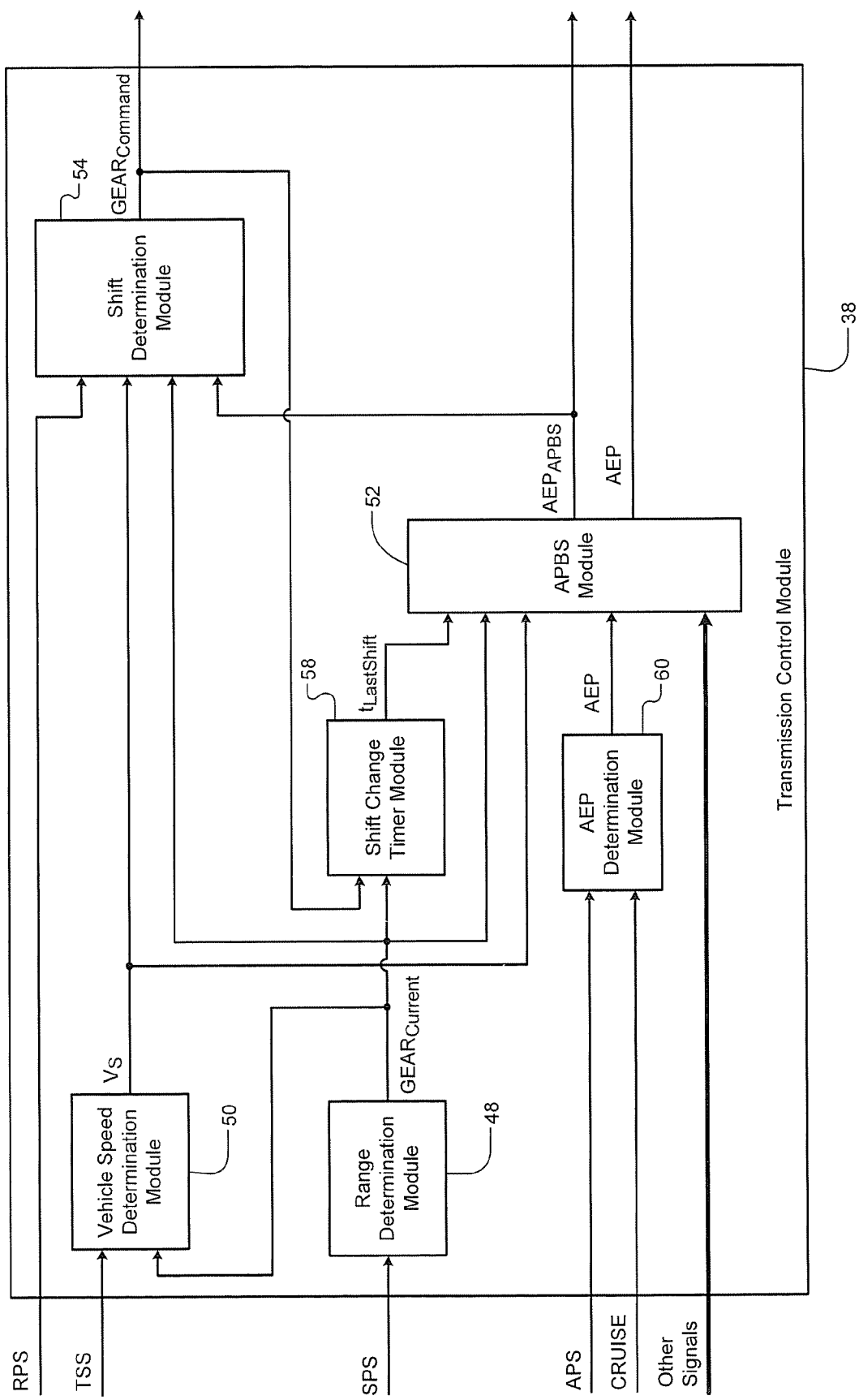
FIG. 2 is a functional block diagram of a transmission control module according to the principles of the present disclosure.
Figure 3:
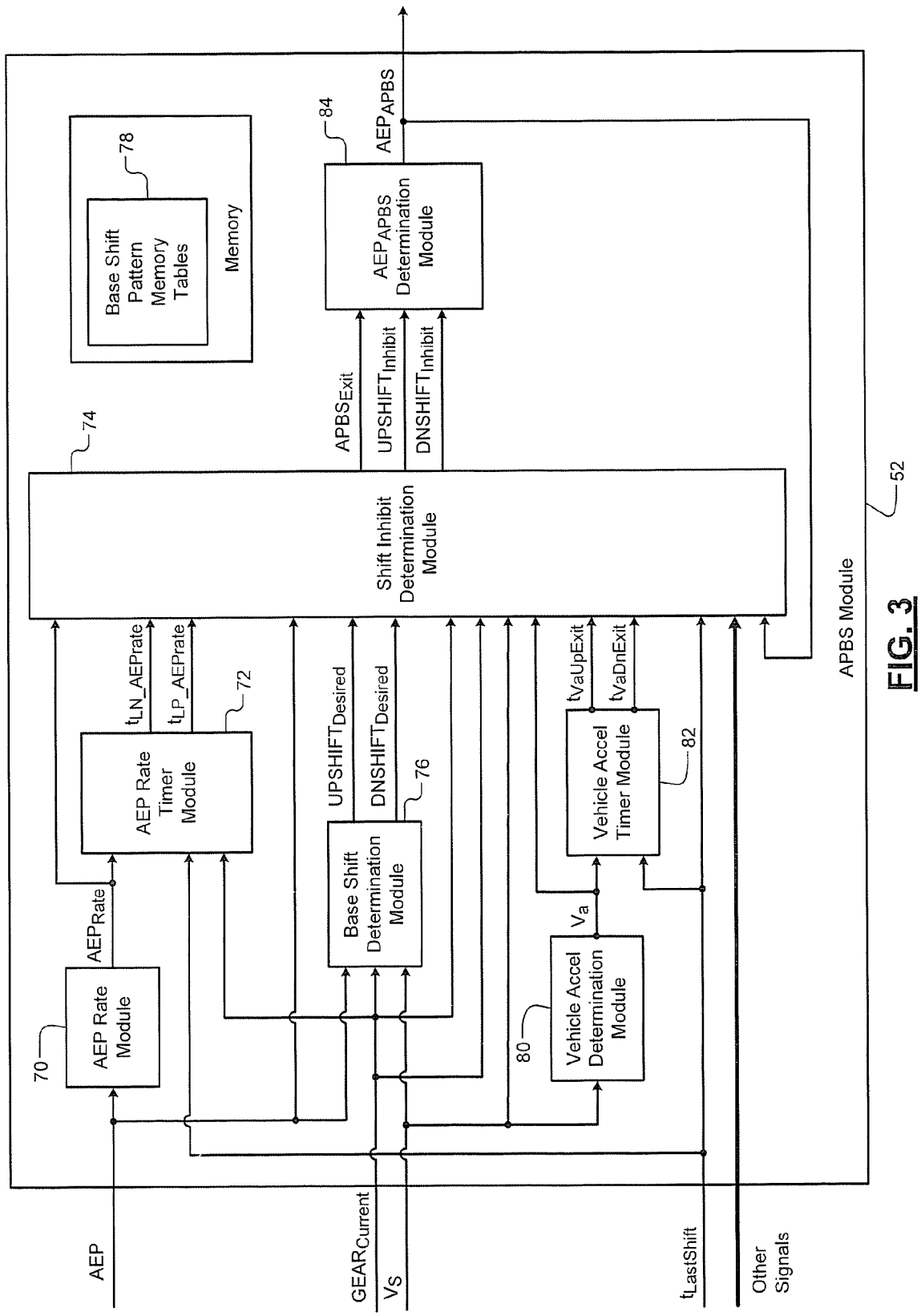
FIG. 3 is a functional block diagram of the accelerator pedal based shift module shown in FIG. 2.

Referring now to FIGS. 2-3 an exemplary control system implementing APBS principles within the transmission control module 38 is shown. With particular reference to FIG. 2, a range determination module 48 receives the solenoid position signal (SPS). Based on the SPS signal, the range determination module 48 generates a current gear signal ($GEAR_{Current}$) indicating the current gear ratio in which the transmission 16 is operating. The range determination module 48 outputs the $GEAR_{Current}$ signal to a vehicle speed determination module 50, an APBS module 52, a shift determination module 54, and a shift change timer module 58.

The vehicle speed determination module 50 receives the transmission speed signal (TSS) and the $GEAR_{Current}$ signal. Based on the TSS and $GEAR_{Current}$ signals, the vehicle speed determination module 50 generates a vehicle speed signal ($V_s$) indicating a current speed of the vehicle system 10 (e.g. wheels 22). The vehicle speed determination module 50 outputs the $V_s$ signal to the APBS module 52 and the shift determination module 54.

The shift change timer module 58 receives the $GEAR_{Current}$ signal and a commanded gear signal ($GEAR_{Command}$) from the shift determination module 54.

Based on the $GEAR_{Current}$ and $GEAR_{Command}$ signals, the shift change timer module 58 generates a time since last shift signal ($t_{LastShift}$). As will be described in more detail below, the $t_{LastShift}$ signal may indicate whether an up shift or down shift is currently being executed or the time that has elapsed since the last up shift or down shift into the current gear.

An AEP determination module 60 receives the APS and CRUISE signals and generates an accelerator effective position signal (AEP) based on the APS and CRUISE signals. The value of AEP may generally represent an effective position of the accelerator pedal 32 that corresponds to a driver intended drive torque. The AEP determination module 60 outputs the AEP signal to the APBS module 52.

The APBS module 52 receives the $V_s$, $t_{LastShift}$, $GEAR_{Current}$, and AEP signals and generates an $AEP_{APBS}$ signal based on the $V_s$, $t_{LastShift}$, $GEAR_{Current}$, and AEP signals it receives. The APBS module 52 may also receive various other signals from the engine control module 36 (FIGS. 2-3, "Other Signals") for generating the $AEP_{APBS}$ signal as will be described. The APBS module 52 outputs the $AEP_{APBS}$ signal to the shift determination module 54. The APBS module 52 may also output AEP and $AEP_{APBS}$ to the engine control module 36 (FIG. 2).

With particular reference to FIG. 3, the APBS module 52 will now be described in further detail. An AEP rate module 70 receives the AEP signal and determines an $AEP_{Rate}$ value corresponding to the time rate of change in the AEP signal. The AEP rate module 70 outputs the $AEP_{Rate}$ to an AEP rate timer module 72.

The AEP rate timer module 72 receives the $AEP_{Rate}$, $t_{LastShift}$, and $GEAR_{Current}$ signals and determines a low negative AEP rate timer value ($t_{LN\_AEPrate}$) and a low positive AEP rate timer value ($t_{LP\_AEPrate}$). The low negative and positive $AEP_{rate}$ timer values may generally correspond to an elapsed time during which $AEP_{rate}$ has remained below a low negative AEP rate threshold value ($AEP_{RateNegThresh}$) and a low positive AEP threshold value ($AEP_{RatePosThresh}$), respectively. The AEP rate timer module 72 determines $t_{LN\_AEPrate}$ and $t_{LP\_AEPrate}$ based on the $AEP_{Rate}$, $t_{LastShift}$, and $GEAR_{Current}$ signals it receives. The AEP rate timer module 72 outputs the $t_{LN\_AEPrate}$ and $t_{LP\_AEPrate}$ values to a shift inhibit determination module 74.

A base shift determination module 76 receives the AEP, $GEAR_{Current}$, and $V_s$ signals. The base shift determination module 76 determines whether an up shift or a down shift may be desired based on a base up shift point vehicle speed value ($VehSpeed_{BaseUShiftPtHi}$) and a base down shift point vehicle speed value ($VehSpeed_{BaseDShiftPtLo}$). The base up shift and down shift vehicle speed values correspond to vehicle speeds at which an up shift and a down shift, respectively, may be desired based on the current gear and accelerator effective position. Accordingly, the base shift determination module 76 compares $V_S$ with the $VehSpeed_{BaseUShiftPtHi}$ value and the $VehSpeed_{BaseDShiftPtLo}$ value when determining whether an up shift or a down shift may be desired. The base shift point vehicle speed values, $VehSpeed_{BaseUShiftPtHi}$ and $VehSpeed_{BaseDShiftPtLo}$, may be looked up in the base shift pattern memory tables 78 based on $GEAR_{Current}$ and AEP. While vehicle speed shift point values are used to determine whether an up shift or a down shift may be desired, it will be appreciated that throttle shift point values may be used as an alternative.

The base shift determination module 76 generates a base up shift desired control signal ($UPSHIFT_{Desired}$) indicating whether an up shift is desired. The base shift determination module 76 also generates a base down shift desired control signal ($DNSHIFT_{Desired}$) indicating whether a down shift is desired. The base shift determination module 76 outputs the UPSHIFT$_{Desired}$ and DNSHIFT$_{Desired}$ signals to the shift inhibit determination module 74.

A vehicle acceleration determination module 80 receives the vehicle speed signal (V$_s$) and determines a vehicle acceleration value (V$_a$) based on the V$_s$ signal. The vehicle acceleration determination module 80 outputs V$_a$ to the shift inhibit determination module 74 and a vehicle acceleration timer module 82.

The vehicle acceleration timer module 82 receives V$_a$ and t$_{LastShift}$ and determines a vehicle acceleration down shift exit timer value (t$_{VaDnExit}$) and a vehicle acceleration up shift exit timer value (t$_{VaUpExit}$). The t$_{VaDnExit}$ and t$_{VaUpExit}$ values may be used to determine whether an inhibited shift condition under APBS should be maintained to avoid shift busyness or exited to maintain the desired vehicle performance. The vehicle acceleration down shift and up shift exit timer values may generally correspond to an elapsed time during which V$_a$ has remained below a down shift and an up shift vehicle acceleration threshold value, respectively.

The shift inhibit determination module 74 receives signals that include AEP, AEP$_{Rate}$, AEP$_{APBS}$, GEAR$_{Current}$, Vs, t$_{LastShift}$, t$_{LN\_AEPrate}$, t$_{LP\_AEPrate}$, t$_{VaUpExit}$, t$_{VaDnExit}$, UPSHIFT$_{Desired}$, and DNSHIFT$_{Desired}$. The shift inhibit determination module may also receive other ECM signals. Based on the signals received, the shift inhibit determination module 74 determines whether the desired up shift or desired down shift that may be indicated by UPSHIFT$_{Desired}$ or DNSHIFT$_{Desired}$ should be inhibited. The shift inhibit determination module 74 generates an UPSHIFT$_{Inhibit}$ signal and a DNSHIFT$_{Inhibit}$ signal to indicate whether the desired up shift or desired down shift should be inhibited. The UPSHIFT$_{Inhibit}$ and DNSHIFT$_{Inhibit}$ signals are output to an AEP$_{APBS}$ determination module 84.

The shift inhibit determination module 74 also generates an APBS$_{Exit}$ signal indicating whether any predetermined APBS exit criteria are met and APBS control should be deactivated. As described in further detail below, the APBS$_{Exit}$ criteria may be met when a difference between AEP and AEP$_{APBS}$ is greater than a shift point offset large calibration value (ShiftPt$_{offLarge}$).

The AEP$_{APBS}$ determination module 84 receives the GEAR$_{Current}$, V$_S$, UPSHIFT$_{Inhibit}$, DNSHIFT$_{Inhibit}$, and APBS$_{Exit}$ signals and determines an AEP$_{APBS}$ value based on these signals. The AEP$_{APBS}$ determination module 84 outputs the AEP$_{APBS}$ value to the shift determination module 54. As will be described in further detail below, AEP$_{APBS}$ may be equal to AEP when the UPSHIFT$_{Inhibit}$ and DNSHIFT$_{Inhibit}$ signals indicate that an up shift or a down shift should not be inhibited.

When the UPSHIFT$_{Inhibit}$ and DNSHIFT$_{Inhibit}$ signals indicate that an up shift or a down shift should be inhibited, the AEP$_{APBS}$ value may be determined based a base up shift point throttle value (Throttle$_{BaseUShiftPtHi}$), a base down shift point throttle value (Throttle$_{BaseDShiftPtLo}$), and a ShiftPt$_{offset}$ value. More particularly, the value of AEP$_{APBS}$ may be set to a value above Throttle$_{BaseDShiftPtLo}$ by the ShiftPt$_{offset}$ value to inhibit an up shift or below Throttle$_{BaseUShiftPtHi}$ by the ShiftPt$_{offset}$ value to inhibit a down shift. The ShiftPt$_{offset}$ value may be less than or equal to the resolution of the value of AEP available in the AEP signal. It will also be appreciated that the ShiftPt$_{offset}$ value will generally be less than ShiftPt$_{offLarge}$.

The base shift point throttle values, Throttle$_{BaseUShiftPtHi}$ and Throttle$_{BaseDShiftPtLo}$, may correspond to accelerator effective positions at which an up shift and a down shift, respectively, may be desired based on the current gear and vehicle speed. The base up shift and down shift point values, Throttle$_{BaseUShiftPtHi}$ and Throttle$_{BaseDShiftPtLo}$, may be determined by performing a reverse look-up of accelerator effective position in the base shift pattern memory tables 78 based on GEAR$_{Current}$ and V$_s$.

When performing the reverse look-up of Throttle$_{BaseUShiftPtHi}$, the value of Throttle$_{BaseUShiftPtHi}$ may be set to the numerically highest value of accelerator effective position stored in the base shift pattern memory tables 78 for the two closest calibration points. Similarly, when performing the reverse look-up of Throttle$_{BaseDShiftPtLo}$, the value of Throttle$_{BaseDShiftPtLo}$ may be set to the numerically lowest value of accelerator position stored in the base shift pattern memory tables 78 for the two closest calibration points.

Referring again to FIG. 2, the shift determination module 54 receives the RPS, V$_s$, GEAR$_{Current}$, and AEP$_{APBS}$ signals. The shift determination module 54 determines the new desired gear ratio based on the RPS, V$_s$, GEAR$_{Current}$, and AEP$_{APBS}$ signals it receives and generates the GEAR$_{Command}$ signal. As previously described, the GEAR$_{Command}$ signal assigns the shift solenoid state corresponding to the new desired gear ratio. Thus, the shift determination module 54 may output the GEAR$_{Command}$ signal to the transmission 16 and thereby regulate the gear ratio in which the transmission 16 is operating. The shift determination module 54 also outputs the GEAR$_{Command}$ signal to the shift change timer module 58.

The shift determination module 54 determines the new desired gear ratio based on an up shift point vehicle speed value (VehSpeed$_{UShiftPt}$) and a down shift point vehicle speed value (VehSpeed$_{DShiftPt}$). The up shift and down shift vehicle speed values correspond to vehicle speeds at which an up shift and a down shift, respectively, may be desired under the currently assigned shift pattern table based on GEAR$_{Current}$ and AEP$_{APBS}$. Accordingly, the base shift determination module 76 compares V$_S$ with the VehSpeed$_{UShiftPt}$ value and the VehSpeed$_{DShiftPt}$ value when determining the new desired gear ratio.

The shift point vehicle speed values, VehSpeed$_{UShiftPt}$ and VehSpeed$_{DShiftPt}$, may be looked up in the currently assigned shift pattern memory table. The particular shift pattern table assigned may vary and may include the base shift pattern memory tables 78, along with other shift pattern tables that may be assigned under particular operating conditions. Accordingly, for example only, VehSpeed$_{UShiftPt}$ and VehSpeed$_{DShiftPt}$ may be looked up in the base shift pattern memory tables 78 based on GEAR$_{Current}$ and AEP$_{APBS}$. It will be appreciated that when AEP and AEP$_{APBS}$ are not equal, the corresponding shift point vehicle speed values determined using AEP and AEP$_{APBS}$, respectively, may also not be equal. In this manner, AEP$_{APBS}$ may be used to inhibit an up shift or a down shift that may otherwise be desired based on AEP.

Referring now to FIGS. 4-15, an exemplary control method 100 according to the principles of the present disclosure is shown. The control method 100 may be implemented in the memory of the powertrain control module 34 and executed by various modules of the powertrain control module 34. Alternatively, the control method 100 may be implemented in the memory of other modules of the vehicle system 10 as may be desired. For clarity, the control method 100 will be described using the various modules previously described herein.

With particular reference to FIG. 4, the control method 100 begins in step 102. In step 102, the AEP determination module 60 determines the current accelerator effective position (AEP) based on the APS and CRUISE signals. The value of AEP may be determined by correcting for any noise present in the APS and CRUISE signals.

In step 104, the range determination module 48 generates the $GEAR_{Current}$ signal based on the SPS signal. The $GEAR_{Current}$ signal indicates the current gear ratio in which the transmission 16 is operating and whether the transmission 16 is shifting between two gear ratios of the transmission 16.

In step 106, the shift change timer module 58 determines the time since last shift ($t_{LastShift}$) based on the $GEAR_{Current}$ signal. While a new shift is in progress, $t_{LastShift}$ is set equal to zero to indicate that a shift is in progress. Otherwise, $t_{LastShift}$ indicates the elapsed time (i.e. seconds) since the last up shift or down shift into the current gear ratio occurred.

In step 108, the AEP rate module 70 determines the AEP rate ($AEP_{Rate}$), which may represent the current rate of change (i.e., velocity) in AEP. Specifically, the AEP rate module 70 may determine $AEP_{Rate}$ by taking the difference between the current value of the AEP signal and the previous value of the AEP signal and dividing by the time between control loops (e.g., 25 milliseconds). In step 108, the AEP rate module 70 also may apply a first order lag filter to the result of the previous calculation in determining $AEP_{Rate}$.

In step 110, the AEP rate timer module 72 determines values for the low AEP rate timers ($t_{LN\_AEPrate}$ and $t_{LP\_AEPrate}$) based on the $AEP_{Rate}$ determined in step 108. With particular reference to FIG. 7, exemplary control steps for determining $t_{LN\_AEPrate}$ and $t_{LP\_AEPrate}$ are shown. In step 120, control determines whether the value of $AEP_{Rate}$ determined in step 108 is less than zero (i.e., negative). If $AEP_{Rate}$ is negative, then control proceeds to step 122, otherwise control proceeds to step 124.

In step 122, control compares $AEP_{Rate}$ with a negative AEP rate threshold value ($AEP_{RateNegThresh}$) obtained from memory based on the $GEAR_{Current}$ signal and $t_{LastShift}$. If $AEP_{Rate}$ is greater than or equal to $AEP_{RateNegThresh}$, then control proceeds in step 126 where the value of $t_{LN\_AEPrate}$ is incremented, otherwise control proceeds in step 128. In step 126 the value of $t_{LN\_AEPrate}$ is incremented by the elapsed time between control loops to reflect the elapsed time during which the $AEP_{Rate}$ has remained greater than or equal to $AEP_{RateNegThresh}$. From step 126, control proceeds in step 140 (FIG. 4). In step 128, $t_{LN\_AEPrate}$ is set to zero and control proceeds in step 140 (FIG. 4).

The value of $AEP_{RateNegThresh}$ may vary with the $t_{LastShift}$. With particular reference to FIG. 8, an exemplary curve illustrating the general relationship between $AEP_{RateNegThresh}$ and $t_{LastShift}$ is shown. Generally, $AEP_{RateNegThresh}$ may vary based on $t_{LastShift}$, such that the lower the value of $t_{LastShift}$, the higher the numerical value of $AEP_{RateNegThresh}$. Put another way, the value of $AEP_{RateNegThresh}$ may approach zero as $t_{LastShift}$ increases.

For example, the value of $AEP_{RateNegThresh}$ may vary from a high numerical value of negative eighty-six percent/sec at a value of $t_{LastShift}$ equal to zero, to a low numerical value of negative four percent/sec at a value of $t_{LastShift}$ equal to six seconds. Thus, the lower the value of $t_{LastShift}$, the easier it may be to enter up shift inhibiting under the control method 100. $AEP_{RateNegThresh}$ and $t_{LastShift}$ may have a linear relationship as illustrated by the line indicated by reference numeral 340. While a linear relationship is shown, other non-linear relationships following the general relationship previously described are contemplated.

Referring again to FIG. 7, in step 124, control compares $AEP_{Rate}$ with a positive AEP rate threshold value ($AEP_{RatePosThresh}$) obtained from memory based on $GEAR_{Current}$. If $AEP_{Rate}$ is less than or equal to $AEP_{RatePosThresh}$, then control proceeds in step 130 where the value of $t_{LP\_AEPrate}$ is incremented, otherwise control proceeds in step 132. In step 130, the value of $t_{LP\_AEPrate}$ is incremented by the elapsed time between control loops to reflect the elapsed time during which the $AEP_{Rate}$ has remained less than or equal to $AEP_{RatePosThresh}$. From step 130, control proceeds in step 140 (FIG. 4). In step 132, $t_{LP\_AEPrate}$ is set to zero and control proceeds in step 140 (FIG. 4).

The value of $AEP_{RatePosThresh}$ may vary with the $t_{LastShift}$. Referring again to FIG. 8, the general relationship between $AEP_{RatePosThresh}$ and $t_{LastShift}$ may be similar to that previously discussed for $AEP_{RateNegThresh}$. Specifically, the lower the value of $t_{LastShift}$, the higher the numerical value of $AEP_{RatePosThresh}$ may be. Thus, the lower the value of $t_{LastShift}$, the easier it may be to enter down shift inhibiting under the control method 100.

Referring again to FIG. 4, in step 140, the vehicle speed determination module 50 determines the current vehicle speed ($V_s$). The value of $V_s$ may be determined in a variety of ways. For example, $V_s$ may be determined based on wheel speed or the rotational speed of the transmission 16, the current gear of the transmission 16, and a driveline ratio. Thus, in step 140, $V_s$ may be determined based on the TSS signal.

In step 142, the vehicle acceleration determination module 80 determines the vehicle acceleration ($V_a$). The value of $V_a$ may be determined in a variety of ways. For example, $V_a$ may be determined by taking the difference between the current value of the $V_s$ and the previous value of $V_s$ determined in step 140 and dividing by the elapsed time between control loops.

In step 144, the vehicle acceleration timer module 82 determines values for the vehicle acceleration exit timers ($t_{VaUpExit}$ and $t_{VaDnExit}$) based on $V_a$. With particular reference to FIG. 9, exemplary control steps for determining $t_{VaUpExit}$ and $t_{VaDnExit}$ are shown. In step 150, control compares $V_a$ with an up shift vehicle acceleration exit threshold value ($a_{VaUpExit}$) obtained from memory. The value of $a_{VaUpExit}$ stored in memory may generally correspond to a vehicle deceleration value above which an up shift should not be inhibited in order to maintain the desired vehicle performance. If $V_a$ is greater than or equal to $a_{VaUpExit}$, control proceeds in step 152 where $t_{VaUpExit}$ is incremented, otherwise control proceeds in step 154. In step 152, $t_{VaUpExit}$ is incremented by the elapsed time between control loops to reflect the elapsed time during which $V_a$ has remained greater than or equal to $t_{VaUpExit}$. From step 152, control proceeds in step 156. In step 154, $t_{VaUpExit}$ is set to zero and control proceeds in step 156.

In step 156, control compares $V_a$ with a down shift vehicle acceleration exit threshold value ($a_{VaDnExit}$) obtained from memory. The value of $a_{VaDnExit}$ stored in memory may generally correspond to a vehicle acceleration value below which a down shift should not be inhibited in order to maintain the desired vehicle performance. If $V_a$ is less than or equal to $a_{VaDnExit}$, control proceeds in step 158 where $t_{VaDnExit}$ is incremented, otherwise control proceeds in step 160. In step 158, $t_{VaDnExit}$ is incremented by the elapsed time between control loops to reflect the elapsed time during which $V_a$ has remained less than or equal to $a_{VaDnExit}$. From step 158 control proceeds in step 170 (FIG. 4). In step 160, $t_{VaDnExit}$ is set to zero and control proceeds in step 170 (FIG. 4).

Referring again to FIG. 4, in step 170, the shift inhibit determination module 74 retrieves information related to general entry conditions necessary to continued control under the control method 100 in the current control loop. The shift inhibit determination module 74 may receive signals related to the general entry conditions from the engine control module 36 (e.g., "Other Signals"). The information related to the general entry conditions may include non-APBS specific information providing a reason to end control under the control method 100 in the current control loop. For example, the general entry conditions may include diagnostic information related to faults with the various vehicle operator interface devices (e.g., throttle 14 and accelerator pedal 32) or sensors (e.g., solenoid position sensing device 24 and transmission speed sensor 26). The general entry conditions may also include information related to current or previously active shift delays and gear overrides.

In step 172, the shift inhibit determination module 74 determines whether the general entry conditions are met. If the general entry conditions are met, control proceeds in step 174, otherwise control returns to step 102 to begin a new control loop under the control method 100.

In step 174, the shift inhibit determination module 74 determines whether there has been a recent shift by comparing $t_{LastShift}$ with a predetermined threshold time value ($t_{LSThresh}$) obtained from memory. The value of $t_{LSThresh}$ may generally be determined to represent a period of time beyond which movement of the accelerator pedal 32 is no longer considered a transient maneuver. If $t_{LastShift}$ is less than $t_{LSThresh}$, then control proceeds in step 176 (FIG. 5), otherwise control returns to step 102 to begin a new control loop under the control method 100.

Referring now to FIG. 5, in step 176, the base shift determination module 76 determines a base up shift vehicle speed value ($VehSpeed_{BaseUShiftPtHi}$) and a base down shift vehicle speed value ($VehSpeed_{BaseDShiftPtLo}$) from the base shift pattern memory tables 78. The $VehSpeed_{BaseUShiftPtHi}$ and $VehSpeed_{BaseDShiftPtLo}$ values may be looked up in the based shift pattern memory tables 78 based on based on $GEAR_{Current}$ and AEP as previously described.

In step 178, the base shift determination module 76 generates the base up shift desired signal ($UPSHIFT_{Desired}$) and the base down shift desired signal ($DNSHIFT_{Desired}$) based on $V_S$, $VehSpeed_{BaseUShiftPtHi}$, and $VehSpeed_{BaseDShiftPtLo}$. The $UPSHIFT_{Desired}$ and $DNSHIFT_{Desired}$ signals may indicate whether an up shift or a down shift may be desired based on the base shift point vehicle speed values (i.e., $VehSpeed_{BaseUShiftPtHi}$ and $VehSpeed_{BaseDShiftPtLo}$).

With particular reference to FIG. 10, exemplary control steps for generating the $UPSHIFT_{Desired}$ and $DNSHIFT_{Desired}$ signals are shown. In step 180, control compares the current vehicle speed, $V_S$, with $VehSpeed_{BaseUShiftPtHi}$. If $V_S$ is greater than $VehSpeed_{BaseUShiftPtHi}$, then control proceeds in step 182, otherwise control proceeds in step 184. In step 182, $UPSHIFT_{Desired}$ is set to "TRUE" and control continues in step 186. In step 184, $UPSHIFT_{Desired}$ is set to "FALSE" and control continues in step 186.

In step 186, control compares the current vehicle speed, $V_S$, with $VehSpeed_{BaseDShiftPtLo}$. If $V_S$ is less than $VehSpeed_{BaseDShiftPtLo}$, then control proceeds in step 188, otherwise control proceeds in step 190. In step 188, $DNSHIFT_{Desired}$ is set to "TRUE" and control continues in step 192 (FIG. 5). In step 190, $DNSHIFT_{Desired}$ is set to "FALSE" and control continues in step 192 (FIG. 5). It will be appreciated that the value of $VehSpeed_{BaseDShiftPtLo}$ will generally be less than the value of $VehSpeed_{BaseUShiftPtHi}$. Thus, the $UPSHIFT_{Desired}$ and $DNSHIFT_{Desired}$ signals will not both be set to TRUE at the same time.

Referring again to FIG. 5, in step 192, the shift inhibit determination module 74 determines whether the $UPSHIFT_{Desired}$ signal is currently indicating an up shift is desired. If the $UPSHIFT_{Desired}$ signal is TRUE, control continues in step 196, otherwise control continues in step 194. In step 194, the shift inhibit determination module 74 determines whether the $DNSHIFT_{Desired}$ signal is currently indicating a down shift is desired. If the $DNSHIFT_{Desired}$ signal is TRUE then control continues in step 198, otherwise control continues in step 304 (FIG. 6).

In step 196, the shift inhibit determination module 74 compares $t_{LN\_AEPrate}$ and a low AEP rate timer threshold value ($t_{LoAEPrateEnable}$) obtained from memory. The value of $t_{LoAEPrateEnable}$ may generally be determined to represent a period of time $AEP_{Rate}$ must remain low in order to enable an APBS shift inhibit under the control method 100. For example may $t_{LoAEPrateEnable}$ have a value equal to 0.150 seconds. If $t_{LN\_AEPrate}$ is greater than or equal to $t_{LoAEPrateEnable}$, then control proceeds in step 200, otherwise control continues in step 304 (FIG. 6).

In step 198, the shift inhibit determination module 74 compares $t_{LP\_AEPrate}$ and $t_{LoAEPrateEnable}$. If $t_{LP\_AEPrate}$ is greater than or equal to $t_{LoAEPrateEnable}$, then control proceeds in step 200, otherwise control proceeds in step 304 (FIG. 6).

In step 200, the shift inhibit determination module 74 generates the up shift inhibit signal ($UPSHIFT_{Inhibit}$) and the down shift inhibit signal ($DNSHIFT_{Inhibit}$). With particular reference to FIG. 11, control proceeds in step 210 where control examines the $UPSHIFT_{Desired}$ signal. If the $UPSHIFT_{Desired}$ signal is TRUE, then control proceeds in step 212, otherwise control proceeds in step 214.

In step 212, control determines whether $V_s$ is within a minimum vehicle speed up shift enable threshold value ($v_{USmin}$) and a maximum vehicle speed up shift enable threshold value ($v_{USmax}$). The minimum and maximum vehicle speed up shift enable threshold values may be predetermined values stored in memory based on the current gear ratio (i.e., $GEAR_{Current}$). Accordingly, If $V_s$ is greater than $v_{USmin}$ and less than $v_{USmax}$, then control proceeds in step 216, otherwise control proceeds in step 218 where control sets $UPSHIFT_{Inhibit}$ equal to "FALSE" and control proceeds in step 240 (FIG. 5).

In step 216, control determines whether the AEP is within a minimum AEP up shift enable threshold value ($AEP_{USmin}$) and a maximum AEP up shift enable threshold value ($AEP_{USmax}$). The minimum and maximum AEP up shift threshold values may be predetermined values stored in memory. For example, $AEP_{USmin}$ and $AEP_{USmax}$ may be predetermined values equal to five percent and eighty-eight percent respectively. Accordingly, if AEP is greater than $AEP_{USmin}$ and less than $AEP_{USmax}$, then control proceeds in step 220, otherwise control proceeds in step 218 where control sets $UPSHIFT_{Inhibit}$ equal to "FALSE" and control proceeds in step 240.

In step 220, control determines whether $V_a$ is greater than a sum of the up shift vehicle acceleration exit threshold value ($a_{VaUpExit}$) and a vehicle acceleration up shift calibration offset value ($a_{USoffset}$). The value of $a_{USoffset}$ may be predetermined and stored in memory for retrieval in step 220 based on the current gear ratio (i.e., $GEAR_{Current}$). If $V_a$ is greater than the sum of $a_{VaUpExit}$ and $a_{USoffset}$, then control proceeds in step 222, otherwise control proceeds in step 218 where control sets $UPSHIFT_{Inhibit}$ equal to "FALSE" and control proceeds in step 240 (FIG. 5). In step 222, control sets $UPSHIFT_{Inhibit}$ equal to "TRUE" and control proceeds in step 240 (FIG. 5).

With continued reference to FIG. 11, in step 214, control sets $UPSHIFT_{Inhibit}$ equal to "FALSE" and control proceeds in step 226. In step 226, control examines the $DNSHIFT_{Desired}$ signal. If the $DNSHIFT_{Desired}$ signal is TRUE, then control proceeds in step 228, otherwise control proceeds in step 232.

In step 228, control determines whether $V_s$ is within a minimum vehicle speed down shift enable threshold value ($v_{DSmin}$) and a maximum vehicle speed down shift enable threshold value ($v_{DSmax}$). The values of $v_{DSmin}$ and $v_{DSmax}$ may be predetermined and stored in memory for retrieval in step 214 based on the gear ratio (e.g. $GEAR_{Current}$). Accordingly, If $V_s$ is greater than $v_{DSmin}$ and less than $v_{DSmax}$, then control proceeds in step 230, otherwise control proceeds in step 232 where control sets $DNSHIFT_{Inhibit}$ equal to "FALSE" and control proceeds in step 240 (FIG. 5).

In step 230, control determines whether AEP is within a minimum AEP down shift enable threshold value ($AEP_{DSmin}$) and a maximum AEP down shift enable threshold value ($AEP_{DSmax}$). The values of $AEP_{DSmin}$ and $AEP_{DSmax}$ may be predetermined and stored in memory. For example, $AEP_{DSmin}$ and $AEP_{DSmax}$ may be predetermined values equal to five percent and eighty-seven percent, respectively. Accordingly, if AEP is greater than $AEP_{DSmin}$ and less than $AEP_{DSmax}$, then control proceeds in step 234, otherwise control proceeds in step 232 where control sets $DNSHIFT_{Inhibit}$ equal to "FALSE" and control proceeds in step 240 (FIG. 5).

In step 234, control determines whether $V_a$ is greater than a sum of the down shift vehicle acceleration exit threshold value ($a_{VaDnExit}$) and a vehicle acceleration down shift calibration offset value ($a_{DSoffset}$). The value of $a_{DSoffset}$ may be predetermined and stored in memory for retrieval in step 234 based on the current gear ratio (e.g., $GEAR_{Current}$). If $V_a$ is greater than the sum of $a_{VaDnExit}$ and $a_{DSoffset}$, then control proceeds in step 236, otherwise control proceeds in step 232 where control sets $DNSHIFT_{Inhibit}$ equal to "FALSE" and control proceeds in step 240 (FIG. 5). In step 236, control sets $DNSHIFT_{Inhibit}$ equal to "TRUE" and control proceeds in step 240 (FIG. 5).

Referring again to FIG. 5, in step 240, the shift inhibit determination module 74 generates the $APBS_{Exit}$ signal indicating whether any predetermined APBS exit criteria are met and APBS control should be deactivated. The APBS exit criteria may include, but is not limited to, a comparison of $AEP_{Rate}$, AEP, $AEP_{APBS}$, $V_a$, and several control parameters as will be described. The APBS exit criteria may be met where the conditions indicate that the driver demands additional authority for vehicle acceleration, the driver no longer requests a down shift or an up shift that is currently being inhibited under the control method 100, or vehicle acceleration is insufficient to achieve the desired vehicle performance.

With particular reference to FIG. 12, exemplary steps for generating the $APBS_{Exit}$ signal are shown. In step 242 control determines whether $AEP_{Rate}$ is less than zero (i.e., negative). If $AEP_{Rate}$ is less than zero, then control proceeds in step 244, otherwise control proceeds in step 246. In step 244, control compares the current $AEP_{Rate}$ and a high negative AEP rate exit calibration threshold ($HiNegAEP_{APBS\_Exit}$) obtained from memory.

The value of $HiNegAEP_{APBS\_Exit}$ may be obtained from memory based on the time since last shift ($t_{LastShift}$). Additionally, the value of $HiNegAEP_{APBS\_Exit}$ may vary based on $t_{LastShift}$ in a manner similar to that previously described for $AEP_{RateNegThresh}$ and $AEP_{RatePosThresh}$. Thus, in step 244, control may look up the value of $HiNegAEP_{APBS\_Exit}$ in memory based on $t_{LastShift}$. If $AEP_{Rate}$ is less than or equal to $HiNegAEP_{APBS\_Exit}$, then control proceeds in step 246 where the shift inhibit determination module 74 sets $APBS_{Exit}$ equal to "TRUE" and control proceeds in step 300 (FIG. 6). If $AEP_{Rate}$ is greater than $HiNegAEP_{APBS\_Exit}$, then control proceeds in step 248.

In step 248, control compares $AEP_{Rate}$ with a high positive AEP rate exit calibration threshold value ($HiPos AEP_{APBS\_Exit}$). The value of $HiPosAEP_{APBS\_Exit}$, like the values of $HiNegAEP_{APBS\_Exit}$, $AEP_{RateNegThresh}$, and $AEP_{RatePosThresh}$, may be based on $t_{LastShift}$. Thus, in step 248, control may look up the value of $HiPosAEP_{APBS\_Exit}$ in memory based on $t_{LastShift}$. If $AEP_{Rate}$ is greater than or equal to $HiPosAEP_{APBS\_Exit}$, then control proceeds in step 246 where the shift inhibit determination module 74 sets $APBS_{Exit}$ equal to "TRUE" as previously described and control proceeds in step 300 (FIG. 6). If $AEP_{Rate}$ is less than $HiPosAEP_{APBS\_Exit}$, then control proceeds in step 250.

In step 250, control compares the difference between AEP and $AEP_{APBS}$ and a shift point offset large calibration value ($ShiftPt_{offLarge}$). The value of $ShiftPt_{offLarge}$ may be a predetermined value stored in memory that operates to discontinue APBS shift inhibiting under the control method 100 when AEP differs from $AEP_{APBS}$ by the value of $ShiftPt_{offLarge}$. Accordingly, in step 250, if the absolute value of the difference between AEP and $AEP_{APBS}$ is greater than $ShiftPt_{offLarge}$, then control proceeds in step 246 as previously described (i.e. $ABPS_{Exit}$ set equal to "TRUE"), otherwise control proceeds in step 252.

In step 252, control compares AEP with a high AEP exit calibration threshold value ($AEP_{APBS\_HighExit}$). The value of $AEP_{APBS\_HighExit}$ may be a predetermined value that is retrieved from memory in step 252. If AEP is greater than or equal to $AEP_{APBS\_HighExit}$, then control proceeds in step 246 as previously described (i.e. $ABPS_{Exit}$ set equal to "TRUE"), otherwise control proceeds in step 254.

In step 254, control compares AEP with a low AEP exit calibration threshold value ($AEP_{APBS\_LowExit}$). The value of $AEP_{APBS\_LowExit}$ may be a single predetermined value that is obtained from memory in step 254. If AEP is less than or equal to $AEP_{APBS\_LowExit}$, then control proceeds in step 246 as previously described (i.e. $APBS_{Exit}$ set equal to "TRUE"), otherwise control proceeds in step 256.

In step 256, control generates a vehicle acceleration up shift exit signal (VaUpExit) that may indicate whether an APBS inhibited up shift should be exited to yield the desired vehicle performance. With particular reference to FIG. 13, exemplary control steps for generating VaUpExit are shown. In step 258, control determines whether $AEP_{Rate}$ is less than zero (i.e. negative). If $AEP_{Rate}$ is less than zero, control proceeds in step 260, otherwise control proceeds in step 262 where control sets VaUpExit equal to "FALSE." From step 262, control proceeds in step 270 (FIG. 12).

In step 260, control compares $t_{VaUpExit}$ and a vehicle acceleration up shift timer calibration threshold value ($t_{VaUpExitThresh}$) obtained from memory. If $t_{VaUpExit}$ is greater than or equal to $t_{VaUpExitThresh}$, then control proceeds in step 264, otherwise control proceeds in step 262 as previously described (i.e., VaUpExit set to "FALSE").

In step 264, control sets VaUpExit to "TRUE" and control proceeds in step 270 (FIG. 12). From the foregoing it will be appreciated that the VaUpExit signal may be used to indicate that an APBS inhibited up shift should be exited on the basis of sustained excessive vehicle deceleration to yield the desired vehicle performance.

Referring again to FIG. 12, in step 270, control determines whether VaUpExit is currently set to "TRUE." If VaUpExit is set to TRUE, then control proceeds in step 246 as previously described (i.e. $ABPS_{Exit}$ is set to "TRUE"), otherwise control proceeds in step 272.

In step 272, control generates a vehicle acceleration down shift exit signal (VaDnExit) that may indicate whether an APBS inhibited down shift should be exited to yield the desired vehicle performance. With particular reference to FIG. 14, exemplary control steps for generating VaDnExit are shown. In step 274, control determines whether $AEP_{Rate}$ is greater than or equal to zero (i.e. positive). If $AEP_{Rate}$ is greater than or equal to zero, then control proceeds in step 276, otherwise control proceeds in step 278 where control sets VaDnExit equal to "FALSE." From step 278, control proceeds in step 290 (FIG. 12).

In step 276, control compares $t_{VaDnExit}$ and a vehicle acceleration down shift timer calibration threshold value ($t_{VaDnExitThresh}$) obtained from memory. If $t_{VaDnExit}$ is greater than or equal to $t_{VaDnExitThresh}$, then control proceeds in step 280, otherwise control proceeds in step 278 as previously described (i.e., VaDnExit set to "FALSE").

In step 280, control sets VaDnExit to "TRUE" and control proceeds in step 290 (FIG. 12). From the foregoing it will be appreciated that the VaDnExit signal may be used to indicate that an APBS inhibited down shift shall be exited on the basis of sustained low vehicle acceleration to yield the desired vehicle performance.

Referring again to FIG. 12, in step 290, control determines whether VaDnExit is currently set to "TRUE." If VaDnExit is set to TRUE, then control proceeds in step 246 as previously described (i.e. $ABPS_{Exit}$ is set to "TRUE"), otherwise control proceeds in step 292.

In step 292, control sets $APBS_{Exit}$ equal to "FALSE" and control proceeds in step 300 (FIG. 6). From the foregoing, it will be appreciated that the $APBS_{Exit}$ signal may be used to indicate an APBS inhibited down shift or up shift should be exited to meet the true intent of the driver or to yield the desired vehicle performance. As the previous discussion illustrates, the $APBS_{Exit}$ signal may be generated based on one or more of the APBS parameters discussed herein, such as, but not limited to $AEP_{Rate}$, $AEP_{APBS}$, $t_{LN\_AEPrate}$, $t_{LP\_AEPrate}$, $HiPosAEP_{APBS\_Exit}$, and $HiNegAEP_{APBS\_Exit}$. The $APBS_{Exit}$ signal also may be generated based on an evaluation of other criteria. For example, other general APBS exit criteria may include whether or not a diagnostic fault has occurred with the accelerator pedal 32, a detent condition exists (i.e., wide open throttle), the base shift pattern has been disabled, a shift delay is currently active, or a gear override is currently active.

Referring now to FIG. 6, control continues in step 300 where the $AEP_{APBS}$ determination module 84 determines whether $APBS_{Exit}$ is set to FALSE. If $APBS_{Exit}$ is set to FALSE, then control proceeds in step 302, otherwise control proceeds in step 304 where the value of $AEP_{APBS}$ is set equal to AEP. From step 304, control proceeds in step 312.

In step 302, the $AEP_{APBS}$ determination module 84 determines whether $UPSHIFT_{Inhibit}$ is set to "TRUE" indicating the current up shift should be inhibited. If $UPSHIFT_{Inhibit}$ is set to TRUE, then control proceeds in step 306, otherwise control proceeds in step 308.

In step 306 the $AEP_{APBS}$ determination module sets $AEP_{APBS}$ equal to $Throttle_{BaseUShiftPtHi}$ plus a shift point offset calibration value ($ShiftPt_{offset}$). The values of $Throttle_{BaseUShiftPtHi}$ and $ShiftPt_{offset}$ may be predetermined values that are retrieved from memory in step 306 as previously described. From step 306, control proceeds in step 312.

In step 308, the $AEP_{APBS}$ determination module determines whether $DNSHIFT_{Inhibit}$ is currently set to "TRUE." If $DNSHIFT_{Inhibit}$ is set to TRUE, then control proceeds in step 310, otherwise control proceeds in step 304 as previously described (i.e. $AEP_{ABPS}$ is set equal to AEP).

In step 310 the $AEP_{APBS}$ determination module sets $AEP_{APBS}$ equal to $Throttle_{BaseDShiftPtLo}$ minus $ShiftPt_{offset}$. The value of $Throttle_{BaseDShiftPtLo}$ may be a predetermined value that is retrieved from memory in step 310 as previously described. By setting the value of $AEP_{APBS}$ to a value above or below the up shift and down shift point throttle values in the foregoing manner, $AEP_{APBS}$ may be used to prevent unnecessary down shifts while maintaining desired vehicle performance. From step 310, control proceeds in step 312.

In step 312, the shift determination module 54 generates the gear command signal ($GEAR_{Command}$) that may be used to assign the shift solenoid state corresponding to the new desired gear ratio. The shift determination module 54 may generate the $GEAR_{Command}$ signal based on the $AEP_{APBS}$ value determined in step 310.

With particular reference to FIG. 15, exemplary control steps for generating $GEAR_{Command}$ are shown. In step 320, control determines an up shift vehicle speed value ($VehSpeed_{UpShiftPt}$) and a down shift vehicle speed value ($VehSpeed_{DnShiftPt}$) by looking up the up shift and down shift points in an assigned shift pattern table based on $GEAR_{Current}$ and $AEP_{APBS}$. The particular shift pattern table assigned may vary and may include the base shift pattern memory tables 78, along with other shift pattern tables that may be assigned under particular operating conditions.

Accordingly, in step 320, control may determine $VehSpeed_{UpShiftPt}$ and $VehSpeed_{DnShiftPt}$ by looking up $VehSpeed_{UpShiftPt}$ and $VehSpeed_{DnShiftPt}$ in the base shift pattern memory tables 78 based on $GEAR_{Current}$ and $AEP_{APBS}$.

In step 322 control compares the current vehicle speed, $V_S$, and $VehSpeed_{UpShiftPt}$. If $V_S$ is greater than $VehSpeed_{UpShiftPt}$, then control proceeds in step 324, otherwise control proceeds in step 326. In step 324, control generates $GEAR_{Command}$ to schedule the next higher gear ratio from $GEAR_{Current}$ (i.e., $GEAR_{Current}+1$). Put another way, control generates $GEAR_{Command}$ to schedule an up shift. From step 324, control proceeds in step 102 (FIG. 4).

In step 326, control compares the current vehicle speed, $V_S$, and $VehSpeed_{DnShiftPt}$. If $V_S$ is less than $VehSpeed_{DnShiftPt}$, then control proceeds in step 328, otherwise control proceeds in step 330. In step 328, control generates $GEAR_{Command}$ to schedule the next lower gear ratio from $GEAR_{Current}$ (i.e., $GEAR_{Current}-1$). Put another way, control generates $GEAR_{Command}$ to schedule a down shift. From step 328, control proceeds in step 102 (FIG. 5).

In step 330, control sets $GEAR_{Command}$ to $GEAR_{Current}$ and control returns to step 102 (FIG. 4) to begin a new control loop under the control method 100.

Referring now to FIG. 16, the general operation of the control method 100 to avoid shift busyness will now be explained. FIG. 16 provides a time-based plot of AEP, $AEP_{APBS}$, up shift and down shift points, and $GEAR_{Command}$ for an exemplary driving maneuver. Thus, FIG. 16 includes an AEP trace 350, an $AEP_{APBS}$ trace 352, a down shift point trace 354, an up shift point trace 356, and a $GEAR_{Command}$ trace 358. For simplicity and purposes of the following discussion, the down shift and up shift point traces 354, 356 are discussed generally and not with particular reference to the shift point vehicle speed values and shift point throttle values previously discussed herein. Additionally, the following discussion assumes the same shift pattern memory table is used to determine the up shift and down shift points based on AEP and $AEP_{APBS}$.

Beginning at reference point 360, the AEP trace 350 is located between the down shift point trace 354 and the up shift point trace 356. At reference point 360, a shift into a new current gear may be in progress or may have just completed. Under the control method 100, while AEP remains between the down shift and up shift point traces 354, 356, the value of $AEP_{APBS}$ determined under the control method 100 will generally be equal to AEP and the $GEAR_{Command}$ signal generated using $AEP_{APBS}$ will maintain the new current gear (i.e., $GEAR_{Current}$).

At reference point 362 where the AEP trace 350 crosses above the down shift point trace 354, the control method 100 may inhibit a down shift based in general, on the time since last shift $t_{LastShift}$ and a comparison of $AEP_{Rate}$ with the low positive threshold value $AEP_{RatePosThresh}$. The value of $AEP_{Rate}$ at reference point 362 is represented by the line designated by reference numeral 364. Where $AEP_{Rate}$ has remained below $AEP_{RatePosThresh}$ for a sufficient period of time (e.g., period of time greater than or equal to $t_{LoAEPrateEnable}$), the control method 100 may inhibit the down shift by setting $AEP_{APBS}$ to a value below the down shift point throttle value (e.g., $Throttle_{BaseDnShiftPtLo}$–$ShiftPt_{offset}$).

While the AEP trace 350 remains above and the $AEP_{APBS}$ trace 352 remains below the down shift point trace 354 as indicated by reference numeral 366, the $GEAR_{Command}$ signal generated using $AEP_{APBS}$ will maintain the current gear. In the foregoing manner, the control method 100 may inhibit a down shift that may otherwise be commanded using AEP to look up the desired gear ratio. The inhibited down shift that may otherwise result using AEP rather than $AEP_{APBS}$ is represented by the dashed line designated by reference numeral 368.

At reference point 370 where the AEP trace 350 crosses above the down shift point trace 354, a down shift may again be inhibited based on the $AEP_{Rate}$ as previously described. The value of $AEP_{Rate}$ at reference point 370 is represented by the line designated at reference numeral 372. It is noted that the value of $AEP_{RatePosThresh}$ at reference point 370 is less than the value of $AEP_{RatePosThresh}$ at reference point 362, since the time since last shift has increased. A down shift may be inhibited while AEP remains above and $AEP_{APBS}$ remains below the down shift point trace 354 as indicated by reference numeral 374. The inhibited down shift that may otherwise result is represented by the dashed line designated by reference numeral 376.

At reference point 378, where the $AEP_{Rate}$ increases, the $AEP_{Rate}$ may become greater than $AEP_{RatePosThresh}$. In this case, the control method 100 may determine that the down shift should not be inhibited and may set $AEP_{APBS}$ equal to AEP. The value of $AEP_{Rate}$ at point 378 is represented by the line designated by reference numeral 380. By setting $AEP_{APBS}$ equal to AEP, the $GEAR_{Command}$ signal generated using $AEP_{APBS}$ to look up the desired gear ratio may be generated to schedule a down shift as represented at reference point 382.

If at reference point 378 the $AEP_{Rate}$ is not greater than $AEP_{RatePosThresh}$, but the difference between AEP and $AEP_{APBS}$ becomes greater than the shift point offset large calibration value, $ShiftPt_{offLarge}$, the control method may decide to exit APBS control. In this case, the control method 100 may set $AEP_{APBS}$ equal to AEP and the $GEAR_{Command}$ signal generated using $AEP_{APBS}$ to look up the desired gear ratio may be generated to schedule a down shift. In both cases, the control method 100 may exit an inhibited shift condition to meet the driver's true intent and desired axle torque.

In the foregoing manner, the control method 100 may be used to reduce shift busyness by reducing the number of down shifts and delaying down shifts that may result under other control methods. The control method 100 also may be used to reduce shift busyness by reducing the number and timing of up shifts that may result under other control methods. In particular, the control method 100 may be used to inhibit unnecessary shifts that may occur as the position of the accelerator pedal 32 approaches the end of a step-in or lift maneuver and vehicle speed (or AEP) crosses a down shift or up shift point. The control method 100 inhibits unnecessary shifts, in general, when the time rate of change in AEP has remained low at the point in time AEP crosses the corresponding down shift or up shift point.

Those skilled in the art may now appreciate from the foregoing description that the broad teachings of the present disclosure may be implemented in a variety of forms. Therefore, while this disclosure includes particular examples, the true scope of the disclosure should not be so limited, since other modifications will become apparent to the skilled practitioner upon a study of the drawings, the specification and the following claims.

What is claimed is:

1. A control system for an automatic transmission comprising:
   a pedal rate module that determines a pedal rate of an accelerator pedal; and
   a shift module that determines a desired gear ratio of said transmission based on a comparison of said pedal rate and a predetermined rate.

2. The control system of claim 1, wherein said shift module inhibits one of a desired up shift and a desired down shift based on said comparison of said pedal rate and said predetermined rate, and wherein said predetermined rate is based on a current gear of said transmission and a first period since said transmission shifted into said current gear.

3. The control system of claim 2, wherein said predetermined rate approaches zero as said first period increases.

4. The control system of claim 3, wherein said predetermined rate includes a positive rate and a negative rate, said positive rate decreases as said first period increases, and said negative rate increases as said first period increases.

5. The control system of claim 1, wherein said shift module further determines said gear ratio based on one of a second period said pedal rate remains less than a positive rate and a third period said pedal rate remains greater than a negative rate.

6. The control system of claim 5, wherein said shift module inhibits one of a desired up shift and a desired down shift when one of said second period is less than a predetermined value and said third period is less than said predetermined value.

7. A control system for an automatic transmission comprising:
   a pedal rate module that determines a pedal rate based on a first pedal position of an accelerator pedal;
   a position module that determines an adjusted pedal position based on said first pedal position and a comparison of said pedal rate and a predetermined rate; and
   a shift module that determines a desired gear of said transmission based on said adjusted pedal position.

8. The control system of claim 7, wherein said predetermined rate is based on a current gear of said transmission and a first period since said transmission shifted into said current gear.

9. The control system of claim 8, wherein said predetermined rate includes a positive rate and a negative rate, said positive rate decreases as said first period increases, and said negative rate increases as said first period increases.

10. The control system of claim 7, wherein said position module determines said adjusted pedal position based on one of a second period said pedal rate remains less than a positive rate and a third period said pedal rate remains greater than a negative rate.

11. The control system of claim 7, wherein said position module further determines said adjusted pedal position based on a predetermined shift point and a predetermined offset.

12. A control method for an automatic transmission comprising:
- determining a pedal rate of an accelerator pedal; and
- determining a desired gear ratio of said transmission based on a comparison of said pedal rate and a predetermined rate.

13. The method of claim 12 further comprising determining a threshold rate based on a current gear of said transmission and a first period since said transmission shifted into said current gear, wherein said determining said desired gear ratio includes inhibiting one of a desired up shift and a desired down shift based on said comparison of said pedal rate and said threshold rate.

14. The method of claim 13 wherein said determining said threshold rate includes determining one of a positive rate and a negative rate, wherein said positive rate decreases as said first period increases and said negative rate increases as said first period increases.

15. The method of claim 12 wherein said determining said desired gear ratio includes determining said desired gear ratio based on one of a second period said pedal rate remains less than a positive rate and a third period said pedal rate remains greater than a negative rate.

16. The method of claim 15 wherein said determining said desired gear ratio includes inhibiting one of a desired up shift and a desired down shift when one of said second period is less than a threshold period and said third period is less than said threshold period.

17. A control method for an automatic transmission comprising:
- determining a pedal rate based on a first pedal position of an accelerator pedal;
- determining an adjusted pedal position based on said first pedal position and a comparison of said pedal rate and a threshold rate; and
- determining a desired gear of said transmission based on said adjusted pedal position.

18. The method of claim 17 further comprising determining said threshold rate based on a current gear of said transmission and a first period since said transmission shifted into said current gear.

19. The method of claim 18 wherein said determining said threshold rate includes determining one of a positive rate and a negative rate, wherein said positive rate decreases as said first period increases and said negative rate increases as said first period increases.

20. The method of claim 17 wherein said determining said adjusted pedal position includes determining said adjusted pedal position based on one of a second period said pedal rate remains less than a positive rate and a third period said pedal rate remains greater than a negative rate.

\* \* \* \* \*